US008755476B2

(12) United States Patent
Li et al.

(10) Patent No.: US 8,755,476 B2
(45) Date of Patent: Jun. 17, 2014

(54) APPARATUS AND METHOD FOR ANTENNA SWITCHING DIVERSITY IN AN OFDM SYSTEM

(75) Inventors: Linbo Li, San Diego, CA (US); Ashok Mantravadi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1138 days.

(21) Appl. No.: 12/695,921

(22) Filed: Jan. 28, 2010

(65) Prior Publication Data

US 2010/0195754 A1   Aug. 5, 2010

Related U.S. Application Data

(60) Provisional application No. 61/148,971, filed on Feb. 1, 2009.

(51) Int. Cl.
*H04B 7/10* (2006.01)

(52) U.S. Cl.
USPC ........... 375/347; 375/346; 375/316; 370/208; 370/210; 370/334; 370/329

(58) Field of Classification Search
USPC .......... 375/347, 346, 316; 370/208, 210, 334, 370/329
See application file for complete search history.

(56) References Cited

U.S. PATENT DOCUMENTS

2005/0254486 A1* 11/2005 Agarwal et al. ............... 370/366
2006/0223476 A1* 10/2006 Song et al. ................. 455/277.2
2007/0115801 A1* 5/2007 Li et al. ......................... 370/208
2008/0020751 A1* 1/2008 Li et al. ......................... 455/424
2009/0016312 A1* 1/2009 Tao et al. ....................... 370/344

FOREIGN PATENT DOCUMENTS

| CN | 1499867 A | 5/2004 |
| EP | 1239609 | 9/2002 |
| TW | 200904042 A | 1/2009 |

OTHER PUBLICATIONS

International Search Report, PCT/US2010/022752, International Searching Authority, European Patent Office, May 10, 2010.
Written Opinion, PCT/US2010/022752, International Searching Authority, European Patent Office, May 10, 2010.
Taiwan Search Report—TW099102981—TIPO—Jan. 17, 2013.

* cited by examiner

*Primary Examiner* — Zewdu Kassa
(74) *Attorney, Agent, or Firm* — Fulbright & Jaworski LLP

(57) ABSTRACT

Methods, systems, and apparatus, including computer programs encoded on computer storage media, for antenna switching diversity comprising: identifying the start of an OFDM symbol period; switching from an original antenna to an alternative antenna; calculating a signal quality metric associated with the original antenna and the alternative antenna; and selecting either the original antenna or the alternative antenna for demodulation of a current OFDM symbol based on the calculated signal quality metric. In one aspect, the antenna switching diversity is based on either symbol rate switching or block rate switching, and a selection of one or the other is made.

50 Claims, 15 Drawing Sheets

APPARATUS AND METHOD FOR ANTENNA SWITCHING DIVERSITY IN AN OFDM SYSTEM

CLAIM OF PRIORITY UNDER 35 U.S.C. §119

The present application for patent claims priority to Provisional Application No. 61/148,971 entitled Method and Apparatus for Symbol Rate Antenna Switching Diversity filed Feb. 1, 2009, and assigned to the assignee hereof and hereby expressly incorporated by reference herein.

TECHNICAL FIELD

This disclosure relates generally to antenna switching diversity in wireless communication systems. More particularly, the disclosure relates to symbol rate or block rate antenna switching diversity for wireless communication systems, for example, in orthogonal frequency division multiplex (OFDM) systems.

BACKGROUND

Wireless communication systems deliver various services to mobile users which are separated from the fixed telecommunications infrastructure. These wireless systems employ radio transmissions to interconnect mobile user devices with base stations in a wireless communication network, often in a cellular geometry. The base stations, in turn, are connected to mobile switching centers which route connections to and from the mobile user devices to other users on different communications networks such as the public switched telephony network (PSTN), Internet, etc. In this manner, users that are away from fixed sites or are on the move may receive a variety of communication services such as voice telephony, paging, messaging, email, data transfers, video, Web browsing, etc.

Since the wireless interconnections between base stations and the mobile users employ radio frequencies, wireless users must use common communication protocols set to share the scarce radio spectrum allocated for wireless communication services. One important protocol relates to the access method used to connect a mobile user device to the wireless communications network. Various access methods include frequency division multiple access (FDMA), time division multiple access (TDMA), code division multiple access (CDMA), and orthogonal frequency division multiplex (OFDM). OFDM is increasingly popular in terrestrial wireless communication systems because its multicarrier format facilitates compensation of multipath distortions. OFDM utilizes a plurality of carriers spaced apart in the frequency domain such that data modulated on each carrier is orthogonal (and thus independent) to the others. OFDM has the advantage of being conveniently modulated and demodulated through very efficient Fast Fourier Transform (FFT) techniques in both the transmitter and receiver.

SUMMARY

Disclosed is an apparatus and method for antenna switching diversity for wireless communication systems. According to one aspect, a method for-antenna switching diversity comprising identifying the start of an OFDM symbol period; switching from an original antenna to at least one alternative antenna; calculating a signal quality metric associated with the original antenna and the alternative antenna; and selecting either the original antenna or the alternative antenna for demodulation of a current or subsequent OFDM symbol based on the calculated signal quality metric.

According to another aspect, a receiver for antenna switching diversity comprising a processor and a memory, the memory containing program code executable by the processor for performing the following: identifying the start of an OFDM symbol period; switching from an original antenna to at least one alternative antenna; calculating a signal quality metric associated with the original antenna and the alternative antenna; and selecting either the original antenna or the alternative antenna for demodulation of a current or subsequent OFDM symbol based on the calculated signal quality metric.

According to another aspect, an apparatus for-antenna switching diversity comprising means for identifying the start of an OFDM symbol period; means for switching from an original antenna to at least one alternative antenna; means for calculating a signal quality metric associated with the original antenna and the alternative antenna; and means for selecting either the original antenna or the alternative antenna for demodulation of a current or subsequent OFDM symbol based on the calculated signal quality metric.

According to another aspect, a computer-readable medium storing a computer program, wherein execution of the computer program is for: identifying the start of an OFDM symbol period; switching from an original antenna to at least one alternative antenna; calculating a signal quality metric associated with the original antenna and the alternative antenna; and selecting either the original antenna or the alternative antenna for demodulation of a current or subsequent OFDM symbol based on the calculated signal quality metric.

Potential advantages of the present disclosure include minimal hardware complexity, implementation of control logic in a DSP, incorporation of improved performance with future antenna or RF hardware improvements, and improved marketing value of dual antenna handset terminals.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

Figure 1:
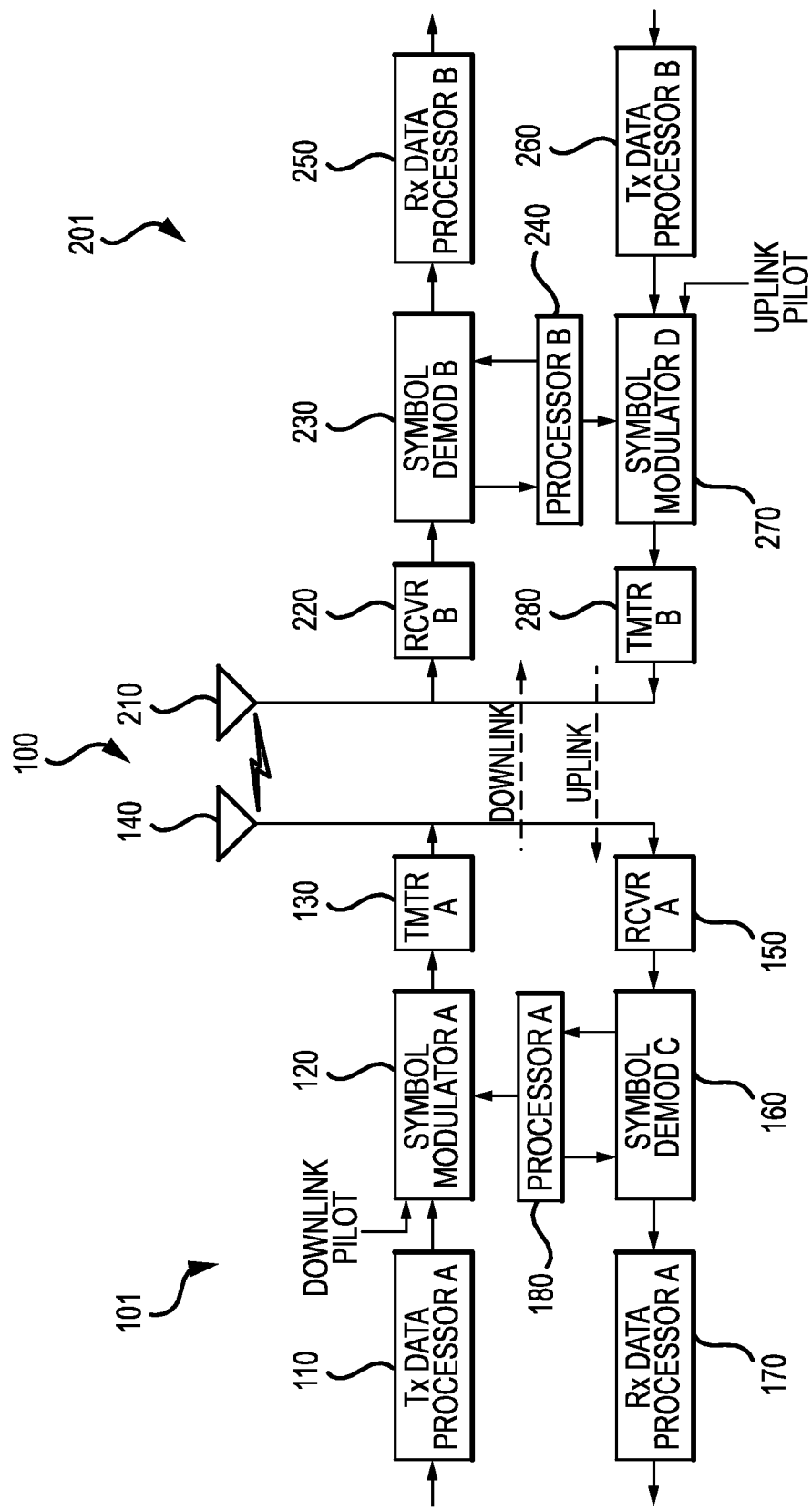
FIG. 1 is a block diagram illustrating an example of a wireless communication system.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). Cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). Cdma2000 is described in documents from an organization named "3rd Generation Partnership Project 2" (3GPP2). These various radio technologies and standards are known in the art.

FIG. 1 is a block diagram illustrating an example of a two terminal system 100. One skilled in the art would understand that the example two terminal system 100 illustrated in FIG. 1 may be implemented in an FDMA environment, an OFDMA environment, a CDMA environment, a WCDMA environment, a TDMA environment, a SDMA environment or any other suitable wireless environment.

In one aspect, the two terminal system 100 includes an access node 101 (e.g., base station or Node B) and a user equipment or UE 201 (e.g., user device). In the downlink leg, the access node 101 (e.g., base station or Node B) includes a transmit (TX) data processor A 110 that accepts, formats, codes, interleaves and modulates (or symbol maps) traffic data and provides modulation symbols (e.g., data symbols). The TX data processor A 110 is in communication with a symbol modulator A 120. The symbol modulator A 120 accepts and processes the data symbols and downlink pilot symbols and provides a stream of symbols. In one aspect, it is the symbol modulator A 120 that modulates (or symbol maps) traffic data and provides modulation symbols (e.g., data symbols). In one aspect, symbol modulator A 120 is in communication with processor A 180 which provides configuration information. Symbol modulator A 120 is in communication with a transmitter unit (TMTR) A 130. The symbol modulator A 120 multiplexes the data symbols and downlink pilot symbols and provides them to the transmitter unit A 130.

Each symbol to be transmitted may be a data symbol, a downlink pilot symbol or a signal value of zero. The downlink pilot symbols may be sent continuously in each symbol period. In one aspect, the downlink pilot symbols are frequency division multiplexed (FDM). In another aspect, the downlink pilot symbols are orthogonal frequency division multiplexed (OFDM). In yet another aspect, the downlink pilot symbols are code division multiplexed (CDM). In one aspect, the transmitter unit A 130 receives and converts the stream of symbols into one or more analog signals and further conditions, for example, amplifies, filters and/or frequency upconverts the analog signals, to generate an analog downlink signal suitable for wireless transmission. The analog downlink signal is then transmitted through antenna 140.

In the downlink leg, the UE 201 (e.g., user device) includes antenna 210 for receiving the analog downlink signal and inputting the analog downlink signal to a receiver unit (RCVR) B 220. In one aspect, the receiver unit B 220 conditions, for example, filters, amplifies, and frequency downconverts the analog downlink signal to a first "conditioned" signal. The first "conditioned" signal is then sampled. The receiver unit B 220 is in communication with a symbol demodulator B 230. The symbol demodulator B 230 demodulates the first "conditioned" and "sampled" signal (e.g., data symbols) outputted from the receiver unit B 220. One skilled in the art would understand that an alternative is to implement the sampling process in the symbol demodulator B 230. The symbol demodulator B 230 is in communication with a processor B 240. Processor B 240 receives downlink pilot symbols from symbol demodulator B 230 and performs channel estimation on the downlink pilot symbols. In one aspect, the channel estimation is the process of characterizing the current propagation environment. The symbol demodulator B 230 receives a frequency response estimate for the downlink leg from processor B 240. The symbol demodulator B 230 performs data demodulation on the data symbols to obtain data symbol estimates on the downlink path. The data symbol estimates on the downlink path are estimates of the data symbols that were transmitted. The symbol demodulator B 230 is also in communication with a RX data processor B 250.

The RX data processor B 250 receives the data symbol estimates on the downlink path from the symbol demodulator B 230 and, for example, demodulates (i.e., symbol demaps), deinterleaves and/or decodes the data symbol estimates on the downlink path to recover the traffic data. In one aspect, the processing by the symbol demodulator B 230 and the RX data processor B 250 is complementary to the processing by the symbol modulator A 120 and TX data processor A 110, respectively.

In the uplink leg, the UE 201 (e.g., user device) includes a TX data processor B 260. The TX data processor B 260 accepts and processes traffic data to output data symbols. The TX data processor B 260 is in communication with a symbol modulator D 270. The symbol modulator D 270 accepts and multiplexes the data symbols with uplink pilot symbols, performs modulation and provides a stream of symbols. In one aspect, symbol modulator D 270 is in communication with processor B 240 which provides configuration information. The symbol modulator D 270 is in communication with a transmitter unit B 280.

Each symbol to be transmitted may be a data symbol, an uplink pilot symbol or a signal value of zero. The uplink pilot symbols may be sent continuously in each symbol period. In one aspect, the uplink pilot symbols are frequency division multiplexed (FDM). In another aspect, the uplink pilot symbols are orthogonal frequency division multiplexed (OFDM). In yet another aspect, the uplink pilot symbols are code division multiplexed (CDM). In one aspect, the transmitter unit B 280 receives and converts the stream of symbols into one or more analog signals and further conditions, for example, amplifies, filters and/or frequency upconverts the analog signals, to generate an analog uplink signal suitable for wireless transmission. The analog uplink signal is then transmitted through antenna 210.

The analog uplink signal from UE 201 (e.g., user device) is received by antenna 140 and processed by a receiver unit A 150 to obtain samples. In one aspect, the receiver unit A 150 conditions, for example, filters, amplifies and frequency downconverts the analog uplink signal to a second "conditioned" signal. The second "conditioned" signal is then sampled. The receiver unit A 150 is in communication with a symbol demodulator C 160. One skilled in the art would understand that an alternative is to implement the sampling process in the symbol demodulator C 160. The symbol demodulator C 160 performs data demodulation on the data symbols to obtain data symbol estimates on the uplink path and then provides the uplink pilot symbols and the data symbol estimates on the uplink path to the RX data processor A 170. The data symbol estimates on the uplink path are estimates of the data symbols that were transmitted. The RX data processor A 170 processes the data symbol estimates on the uplink path to recover the traffic data transmitted by the wireless communication device 201. The symbol demodulator C 160 is also in communication with processor A 180. Processor A 180 performs channel estimation for each active terminal transmitting on the uplink leg. In one aspect, multiple terminals may transmit pilot symbols concurrently on the uplink leg on their respective assigned sets of pilot subbands where the pilot subband sets may be interlaced.

Processor A 180 and processor B 240 can direct (i.e., control, coordinate or manage, etc.) operation at the access node 101 (e.g., base station or Node B) and at the UE 201 (e.g., user device), respectively. In one aspect, either or both processor A 180 and processor B 240 are associated with one or more memory units (not shown) for storing of program codes and/or data. In one aspect, either or both processor A 180 or processor B 240 perform computations to derive frequency and impulse response estimates for the uplink leg and downlink leg, respectively.

In one aspect, the two terminal system 100 is a multiple-access system. For a multiple-access system (e.g., frequency division multiple access (FDMA), orthogonal frequency division multiple access (OFDMA), code division multiple access (CDMA), time division multiple access (TDMA), space division multiple access (SDMA), etc.), multiple terminals transmit concurrently on the uplink leg, allowing access to a plurality of UEs (e.g., user devices). In one aspect, for the multiple-access system, the pilot subbands may be shared among different terminals. Channel estimation techniques are used in cases where the pilot subbands for each terminal span the entire operating band (possibly except for the band edges). Such a pilot subband structure is desirable to obtain frequency diversity for each terminal.

Figure 2:
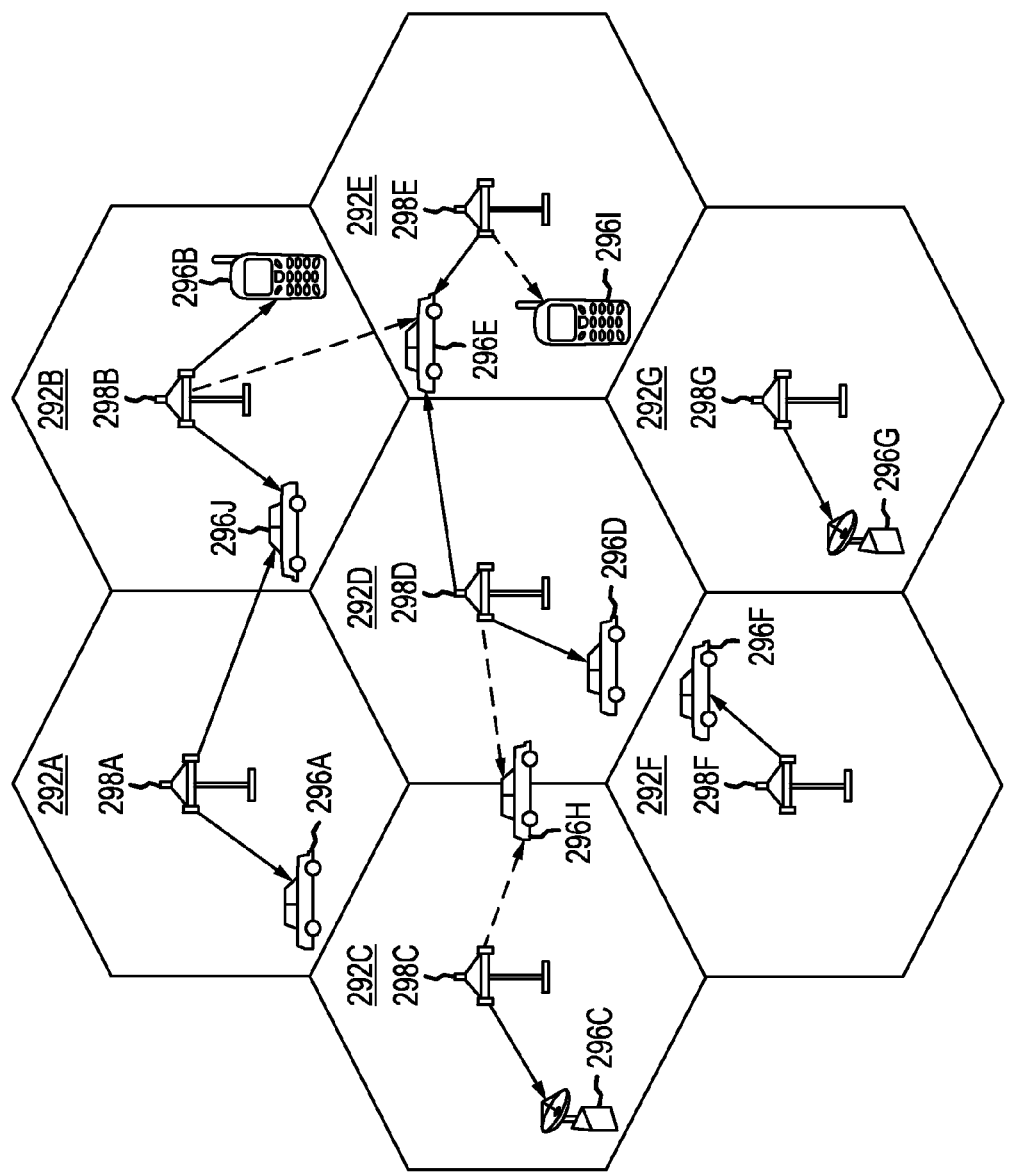
FIG. 2 illustrates an example wireless communications system that supports a plurality of user devices.

FIG. 2 illustrates an example wireless communications system 290 that supports a plurality of user devices. In FIG. 2, reference numerals 292A to 292G refer to cells, reference numerals 298A to 298G refer to base stations (BS) or node Bs and reference numerals 296A to 296J refer to access user devices (a.k.a. user equipments (UE)). Cell size may vary. Any of a variety of algorithms and methods may be used to schedule transmissions in system 290. System 290 provides communication for a number of cells 292A through 292G, each of which can be serviced by a corresponding base station 298A through 298G, respectively.

Antenna diversity is a radio transmission technique where more than one antenna is applied at a user terminal or base station. To improve performance, some wireless systems use antenna diversity in the transmitter, the receiver or both. One form of antenna diversity is known as switching diversity where some processing logic decides which one of several possible antennas should be used at a given time. Processing logic may be implemented, for example, by software or firmware executing on a processor, such as a microprocessor. In some implementations, antenna switching diversity is the simplest diversity technique. However, processing logic must be implemented to execute diversity reception in a user terminal.

In one example, a wireless communication system provides multicasting services to user devices. Multicasting is a transmission method from one transmitter to many receivers simultaneously in a coverage area. An example of a multicasting standard is known as MediaFLO (Forward Link Only). In one aspect, the MediaFLO physical layer employs OFDM with 4096 carriers over the system bandwidth, with a much higher data capacity than other systems. Multicasting services include real-time video and audio streams, non-real time video and audio clips, data content, etc. In one example, the MediaFLO OFDM symbol time is 833.33 µs, comprised of 738.02 µs of bearer traffic, 3.06 µs of window, and 92.25 µs of cyclic prefix. In one aspect, a cyclic prefix is a repetition of the end of an OFDM symbol at the beginning of the next OFDM symbol to mitigate multipath interference. The MediaFLO system also supports 1024, 2048 and 8192 sub-carriers in addition to the 4096 sub-carriers option. The use of 1024, 2048, 4096 or 8192 sub-carriers is also referred to as having 1K, 2K, 4K and 8K carriers in FLO.

Figure 3:
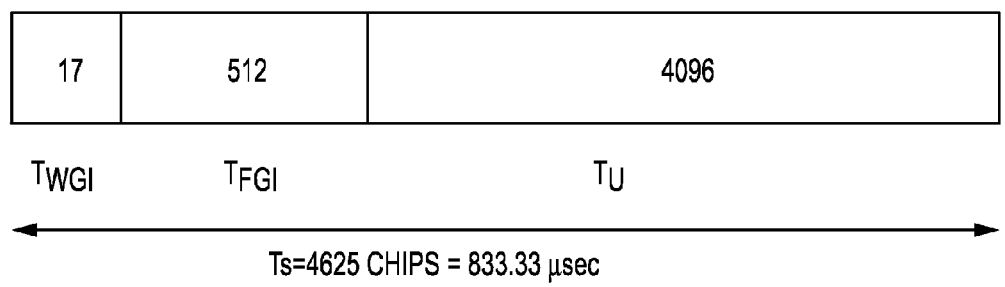
FIG. 3 illustrates an example OFDM symbol timeline.

FIG. 3 illustrates an example OFDM symbol timeline. In one aspect, the OFDM symbol duration consists of three distinct time portions: a windowed guard interval $T_{WGI}$, a flat guard interval $T_{FGI}$, and a useful symbol interval $T_U$. In one example, the flat guard interval is also known as a cyclic prefix (CP) interval. In another example, the useful symbol interval is also known as a FFT interval. The sum of these three distinct time portions is denoted as the OFDM symbol time $T_S$.

In one aspect, the OFDM symbol time is comprised of a plurality of chips, each of which has a time duration defined as the reciprocal of a sample clock. For example, a sample rate of 5.55 MHz is equivalent to a chip with time duration of 0.18 µs. In one example, the following values are assigned to the three distinct time portions of the OFDM symbol for the case of a 5.55 MHz sample rate:

$$\begin{array}{r}T_{WGI} = 17 \text{ chips} = 3.06 \text{ µs(windowed guard interval)} \\ T_{FGI} = 512 \text{ chips} = 92.25 \text{ µs(cyclic prefix interval)} \\ \underline{T_U = 4096 \text{ chips} = 738.02 \text{ µs(useful interval)}} \\ T_S = 4625 \text{ chips} = 833.33 \text{ µs}(OFDM \text{ symbol time})\end{array}.$$

In another example, it is noted that the available time for antenna switching within a CP increases for 5 MHz FLO bandwidth. For other bandwidths and shorter CPs (256), it is necessary to decrease the automatic gain control (AGC) acquisition time by programming the AGC fast acquisition period to a lower value, and/or increase the DSP clock rate.

Figure 4:
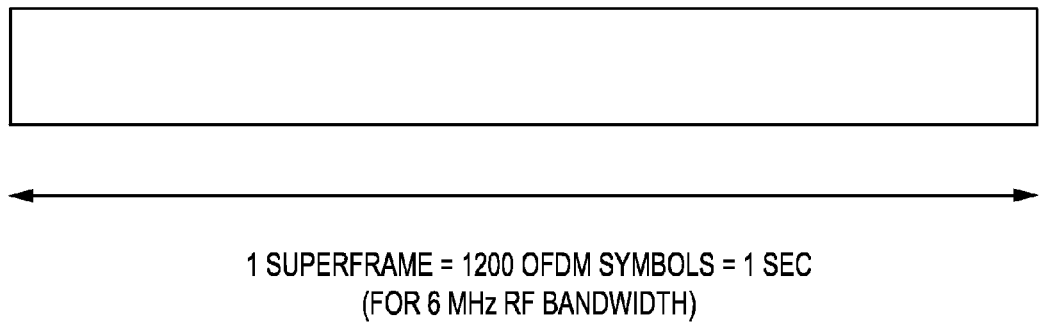
FIG. 4 illustrates an example FLO superframe structure.

Furthermore, in another aspect, a FLO superframe can consist of a plurality of OFDM symbols. FIG. 4 illustrates an example FLO superframe structure. As illustrated in FIG. 4, in one example, a FLO superframe consists of 1200 OFDM symbols for the case of 6 MHz RF bandwidth.

In one aspect, for a multicast or broadcast OFDM communication system, the OFDM symbols may be organized into groups of bits, for example frames. In addition, the physical layer packets (PLP) may be encoded with a Reed-Solomon (RS or R-S) code and distributed across the frames in a superframe to exploit time diversity of the fading channel. In one aspect, several channel realizations are seen over the duration of each RS code block and hence the packets may be recovered even if a deep fade occurred during some of the packets. However, for low speeds (i.e., low Doppler spread) of the mobile terminal, the channel coherence time may be longer compared to the RS code block time span and the channel may evolve slowly. As a result, little time diversity can be gained within an RS code block. For example, in MediaFLO, an RS code block can span across four frames with time duration of approximately 0.75 seconds. If the time diversity is insufficient, another form of diversity, such as multiple antenna receive diversity can improve system performance.

In one example, two basic forms of antenna diversity may be employed, namely, maximum ratio combining (MRC) and switching diversity. The MRC diversity scheme combines signals from two receive antennas on a per carrier basis, which maximizes the output signal/noise ratio (SNR). However, MRC requires the use of two RF chains and two baseband chains up to the channel decoder. MRC diversity may result in excessive complexity in the receiver design. A simpler method of space diversity is desired which mitigates channel fading without prohibitive complexity.

Antenna switching diversity requires only an antenna switch and minimum control logic for signal measurement and antenna selection for effective mitigation against channel fading. This disclosure proposes a hardware design for symbol rate receive antenna switching diversity for wireless communications systems.

The baseline switching diversity scheme has an antenna selection rate of once per Multicast Logical Channel (MLC) block and referred to as block rate switching. In one aspect, switching diversity can improve system performance by selecting the antenna with greater RSSI (received signal strength indication) for decoding, especially, for example, for the low Doppler regime in which very limited time diversity can be exploited by the Reed-Solomon outer code used in FLO. Switching diversity can operate on one RF and baseband chain, and only requires an antenna switch and minimum control logic for antenna selection. The control logic can be easily implemented and in low cost in a digital signal processor (DSP) with little extra hardware requirement. Additionally, switching diversity performance can be improved with future antenna or RF improvements that would reduce the gain imbalance or correlation between the antennas.

Thus, in one aspect, switching diversity can result in the following potential advantages over other forms of diversity:
  Minimal hardware complexity
  Implementation of control logic in a DSP
  Incorporation of improved performance with future antenna or RF hardware improvements
  Improved marketing value of dual antenna handset terminals In one aspect, a higher antenna switching/selection rate yields more antenna diversity at the receiver. The highest rate of antenna switching is once per OFDM symbol and is referred to as symbol rate switching. Switching faster than the symbol rate is undesirable since this may disrupt the samples within the FFT window of an OFDM symbol and cause significant performance degradation.

In one example, in the FLO system, time-filtering is used to enhance the quality of a channel estimate by performing a weighted average of the raw channel estimates of adjacent OFDM symbols. To enable the symbol rate antenna switching, it is required that the time-filtering for channel estimation be disabled. If an antenna is switched across adjacent OFDM symbols, the different fading and gain differential between the primary and secondary antennas can cause aliasing in the channel estimate.

In one example, for the block rate switching scheme, one extra symbol (or two extra symbols if for FLO 2K mode) is devoted for RSSI measurement and antenna selection before the next MLC block. The antenna with greater RSSI is selected for decoding for the entire following MLC block. In one example, the time margin for the switching operations is roughly 4625 samples, or approximately 830 µs. Due to the less stringent time restriction, regular mode of automatic gain control (AGC) acquisition (e.g., 256 samples per update period) can be used and the settling time of the analog circuit does not significantly impact the time budget.

Among the three switching diversity modes, namely, per MLC block or block rate switching, per symbol or symbol rate switching, and single antenna or no switching, the algorithm of selecting between the modes is also important. In one example, the mode selection algorithm runs in the DSP and makes the selection based on the input data from other blocks such as Doppler estimate. In one example, the procedure for the mode selection is outlined as follows.

In one aspect, two thresholds may be used: T1 for a low Doppler limit and T2 for a high Doppler limit. For low Doppler (Doppler<T1), since time-filtering is always enabled for low Doppler, block rate switching diversity can be beneficial due to the lack of available time diversity. For T1<Doppler<T2, it can be desirable to simply disable switching diversity and use the primary antenna, especially if there is gain differential between the primary and secondary antennas. For very high Doppler (Doppler>T2), time-filtering can be turned off. Therefore, symbol rate switching diversity can be enabled to obtain the maximum antenna diversity gain. The thresholds T1 and T2 can be chosen such that the overall gain resulted from a particular combination of antenna switching and time-filtering is maximized. The thresholds depend on factors such as antenna differential, correlation, MLC duration, multipath fading profile, etc.

Figure 5:
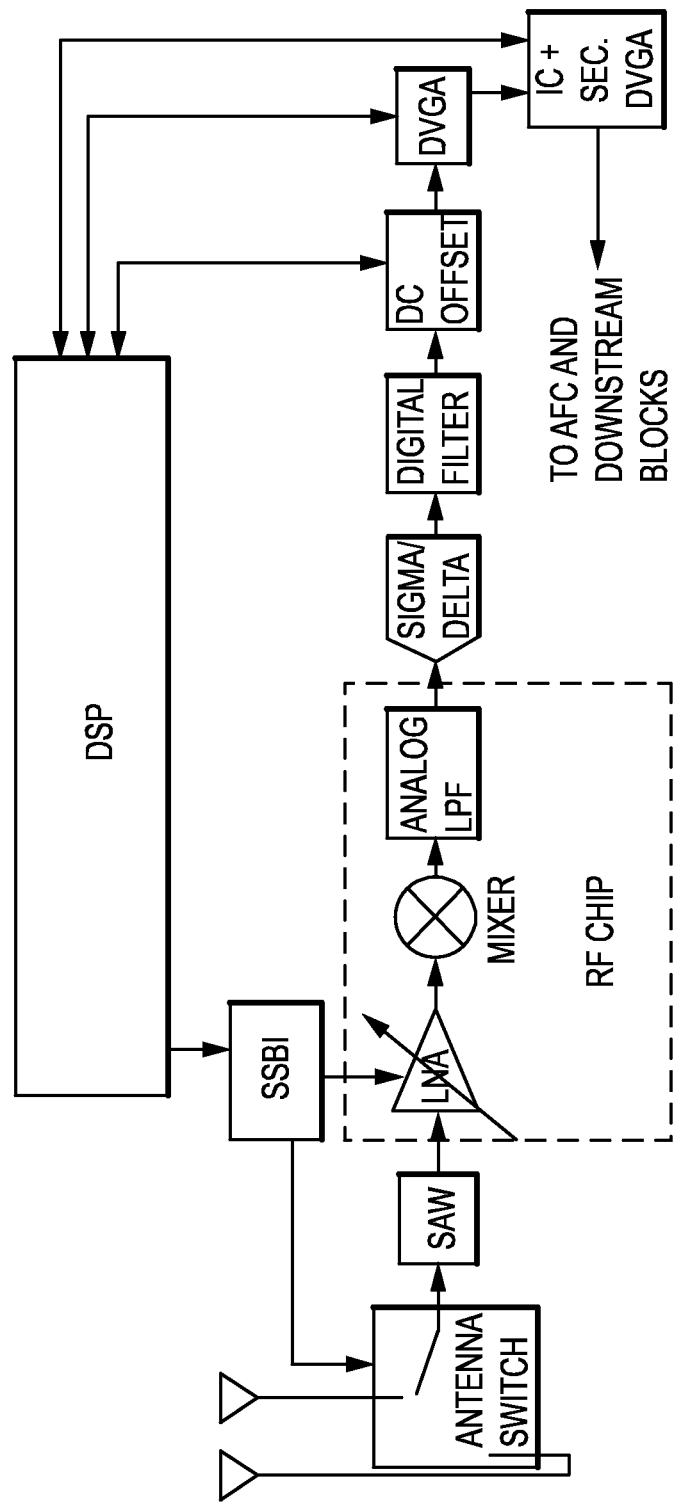
FIG. 5 illustrates an example block diagram for symbol rate antenna switching diversity for OFDM systems.

FIG. 5 illustrates an example block diagram for symbol rate antenna switching diversity for OFDM systems. In FIG. 5, the additional hardware components compared to a conventional receiver are an extra antenna and antenna switch which selects either one of the two antennas. The DSP block controls the antenna switch through, for example, a single wire serial bus interface (SSBI) block. The DSP also has two-way connections to the DC offset, digital variable gain amplifier (DVGA), interference cancellation (IC), second digital variable gain amplifier (DVGA), for various functionalities, such as register backup and restoration, RSSI calculation, etc. The radio frequency (RF) chip is shown in the dashed box. In one example, for a FLO handset, one of the two antennas is the dedicated primary FLO antenna. The other FLO antenna (secondary antenna) usually has less gain than the primary antenna due to form-factor limitations or because it is shared with a CDMA receiver, for example.

The performance improvement from switching diversity depends on a number of factors such as the antenna switching mode (block rate, symbol rate, no switching), Doppler, channel delay spread, and antenna parameters (gain differential, correlation of the primary and secondary antennas, the insertion loss of the antenna switch).

In one example, the functionalities between DSP and a processor may be divided as follows:

The DSP responds to an interrupt for the programmed OFDM symbol and an interrupt for every OFDM symbol and triggers the timeline of antenna switching/selection. This step reduces the interrupt response latency due to the time sensitive nature of antenna selection.

The processor manages the programming of the interrupt for the programmed OFDM symbol and schedules the OFDM symbol index at which antenna selection is triggered. In this way, the DSP does not need to coordinate antenna switching with sleep and multiple frequency networks (MFNs), which is currently handled in the processor.

The advantages of the functionality division described above can be that the processor does not need to know the mode of switching diversity (symbol rate, block rate, and no switching), which is handled by DSP block. Moreover, the DSP does not need to know the location of MLCs and coordinate with sleep, MFN reacquisition and handoff, which are currently handled by the processor.

Examples described herein are meant for illustration only and are not meant to limit the scope or spirit of the present disclosure. In one aspect, the required functionalities of the DSP block may include one or more of the following:

Calculating time instance for antenna switching and programming it to hardware as an interrupt
Responding to various interrupts triggered by the hardware
Backing up and restoring registers
Switching antenna through the SSBI block
Triggering automatic gain control (AGC) acquisition on the other antenna
Reading AGC and DVGA registers and calculate RSSI Symbol Rate Switching In one example, for symbol rate antenna switching, we may switch to the other antenna currently not used and measure its RSSI during the cyclic prefix (CP) of an OFDM symbol. Due to the short duration of a CP (92 μs for 512 CP 6 MHz bandwidth), the operation is very time-constrained. First, we discuss the timeline constraints faced by the symbol rate switching. Next, we discuss the DSP solutions to these constraints.

In one example, the basic operations of symbol rate antenna switching/selection are as follows. During the CP of an OFDM symbol, the DSP switches to the antenna currently not being used (referred to as the other antenna hereafter) and measures its RSSI. This RSSI is then compared with the RSSI on the current antenna obtained at the end of the previous OFDM symbol as part of normal AGC tracking Then the RSSI difference is calculated as:

$$\text{RSSI\_Diff} = -(d\_curr - d\_other) * 3.01/1024 \text{ (dB)} \qquad \text{Eq. (1)}$$

where d_curr and d_other are the sum of AGC and DVGA loop accumulators. The current antenna is selected if RSSI_Diff>0. Otherwise, the other antenna is selected. In Eq. (1) we assume that the analog gain states are the same when the RSSI is measured on both antennas. This is a design requirement for symbol rate switching, which will be further elaborated later.

In one aspect, because of the time-constrained nature of the RS SI measurement within a CP, the following restrictions can be considered in the design:

Restriction 1:
AGC acquisition update rate—the regular AGC/DVGA acquisition rate is 256 samples per update. Ideally we need a few AGC/DVGA updates for loop convergence in order to get accurate RSSI estimates. Obviously, to fit these updates into the CP (nominally 512 chips for 4K mode, can be $\frac{1}{16}$, $\frac{1}{8}$, $\frac{3}{16}$, $\frac{1}{4}$ of FFT size), a faster AGC/DVGA acquisition mode is necessary.

Restriction 2:
Analog gain settling time—when the analog gain state is switched by AGC, the settling time of the new GS is approximately 20 μs (~110 samples for 6 MHz). During the analog GS transition transient, no reliable energy estimation can be obtained. In the regular mode of AGC/DVGA acquisition, the first 128 samples within an acquisition update period are simply ignored during energy estimation to avoid such possible transient. As a result of its impact on the time budget, analog GS transition should be disabled during RSSI measurement within a CP.

Restriction 3:
Conflict with automatic frequency control (AFC) update—the AFC uses the second half of the CP for frequency loop update. This also impacts the time available for switching diversity.

Restriction 4:
Data mode time tracking (DMTT) offset—when DMTT applies a positive timing offset (sample counter positively adjusted) at the beginning of an OFDM symbol, the available CP length can be decreased for antenna switching operations.

Restriction 5:
In symbol rate switching, we may still need to obtain the estimates on Doppler and excess channel energies in order to select other switching modes. As a result, for the length of the underlying time-filter, the antenna needs to be the same. This restriction exists only if Doppler and excess energy estimation is being done during the MLC. The excess energy and Doppler can also be estimated using the transition pilot channel (TPC) and the previous OFDM symbol. In this case, this restriction is not required. In one example, the DSP has a flag variable, named Switching_Mode, for differentiating the situations. Specifically, this variable being 0, 1, 2 corresponds to no switching, block-rate switching, and symbol-rate switching, respectively. When Doppler estimation is being performed, the DSP scheduling of the antenna switching should be in sync with the underlying Doppler estimation so that the channel estimates for Doppler estimation should be from the same antenna.

In one example, the DSP may be designed to cope with these restrictions. For example, Restriction 1 is solved by introducing a fast AGC/DVGA acquisition mode.

In another example, for Restriction 2, DSP triggers symbol rate switching only when the current analog GS is zero. That is, LNA/mixer is at highest analog gain and the antenna feed is weak. This is because for other gain states due to the high RSSI, the limiting factor is the signal dependent RF noise floor. Stronger RSSI does not necessarily mean a higher overall SINR. Moreover, at such input signal level, for most of FLO modes, decoding can be error-free even without switching diversity.

In order to avoid the RF settling time associated with analog GS transition, it is required that there is no analog gain state transition at the end of the previous symbol, and the analog gain state should remain at zero throughout the operations for symbol rate antenna switching/selection. This brings another issue of RF saturation: If the RSSI on the current antenna is close to the GS transition point and if the other antenna has RSSI a few dB higher, forcing the gain state to zero could saturate the RF circuit when the other antenna is selected. To solve this problem, the symbol rate antenna switching can be triggered only if RSSI on the current antenna is more than 10 dB lower than the switch point of GS 0 (for example, −75 dBm could be used as default value). The DSP can calculate the RSSI on the current antenna by reading AGC/DVGA loop accumulators.

To deal with Restrictions 3, 4, the AFC tracking, positive DMTT updates, and Doppler estimation can be mutually exclusive to the symbol rate antenna switching. For Doppler estimation, antenna selection should not change within the length of the underlying time-filter for Doppler estimation. To separate AFC update and antenna switching, the AFC can perform frequency tracking once in three OFDM symbols, and the antenna switching/selection can be triggered for the other two symbols every third OFDM symbol. For DMTT update, when there is a positive DMTT update at the end of the previous symbol, symbol rate antenna switching can be disabled.

In the switching mode selection, it is also of interest to measure the RSSIs on both antennas at OFDM symbol rate. To this end, DSP can also trigger the RSSI measurement within CP whenever there is no AFC and DMTT update, even when the time-filter is on. However, DSP will not calculate the RSSI difference and switch antenna for data demodulation.

Figure 6:
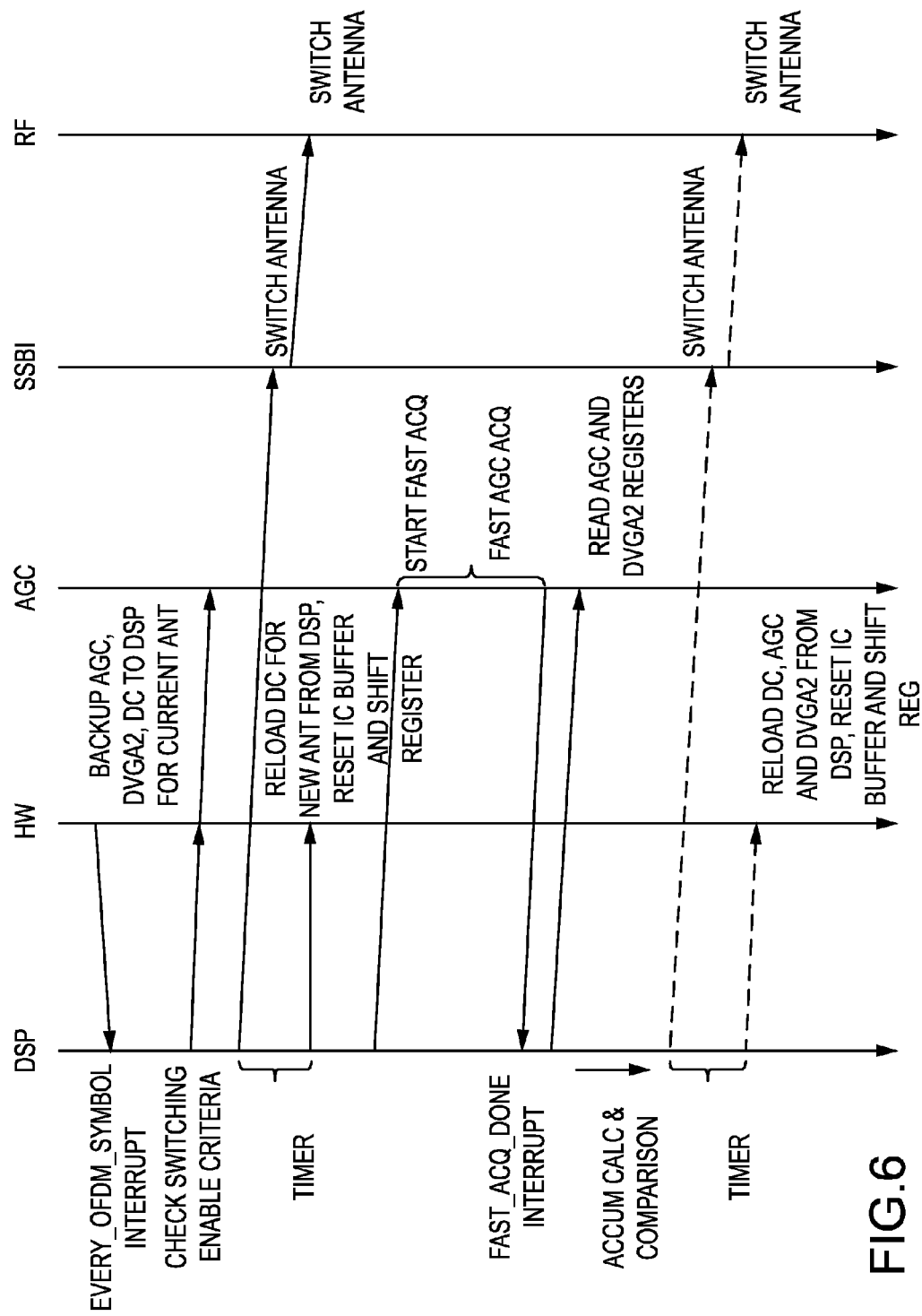
FIG. 6 illustrates an example symbol rate antenna switching interaction diagram.

FIG. 6 illustrates an example symbol rate antenna switching interaction diagram. As shown in FIG. 6, the DSP responds to the interrupt of every OFDM symbol and triggers the symbol rate antenna switching if the switching criteria are met. The interrupt of every OFDM symbol is triggered when the sample counter rolls over at symbol boundary. In one example, the detailed DSP operations can be described by the following pseudo code.

The DSP first checks the operating mode of the switching diversity. The mode is stored in a DSP variable Switching_Mode. This variable being 0, 1, 2 correspond to no switching, block-rate switching, and symbol-rate switching, respectively. If Switching_Mode variable is equal to 2, the DSP then proceeds to check the following antenna switching criteria:

Criterion 1: DSP checks if there is a positive DMTT update at the previous OFDM symbol boundary.

Criterion 2: DSP checks if there is an analog gain switching at the end of the previous OFDM symbol.

Criterion 3: DSP reads the current OFDM symbol index, calculates the frame index, and checks if Doppler estimation is done for this frame.

Criterion 4: DSP checks if AFC frequency tracking is scheduled for the current symbol. The DSP scheduling of AFC tracking can be reset upon the interrupt of the programmed OFDM symbol so that for each MLC block the scheduling starts fresh.

If all criteria are false, DSP can perform the following operations:

Read and back-up AGC/DVGA loop accumulators

Compare current AGC Loop accumulator (Accu_curr) to Threshold

If (Accu_curr>Threshold), which means the RSSI is below the threshold

Disable AFC update. Note that if the antenna switching conditions above are not met, DSP should not disable AFC update and AFC will continue updating the frequency accumulator for the current symbol.

Back-up DC offset registers for the current Antenna and GS 0 only Switch Antenna and start antenna timer.

After timer expires, reload DC offset registers for the other antenna and GS 0

Reset interference-cancellation (IC)

Enable AGC fast acquisition

At the end of the AGC fast acquisition, FAST_ACQ_DONE interrupt can be fired to the DSP. The DSP can perform the following operations:

Read AGC/DVGA loop accumulators

Compute the RSSI difference from that of the current antenna as: RSSI_diff=AGC_accu_curr+DVGA2_accu_curr−(AGC_accu_other+DVGA_accu_other) (3A+1C~3R)

If (RSSI_diff<0)

Switch antenna and start antenna timer

Figure 7:
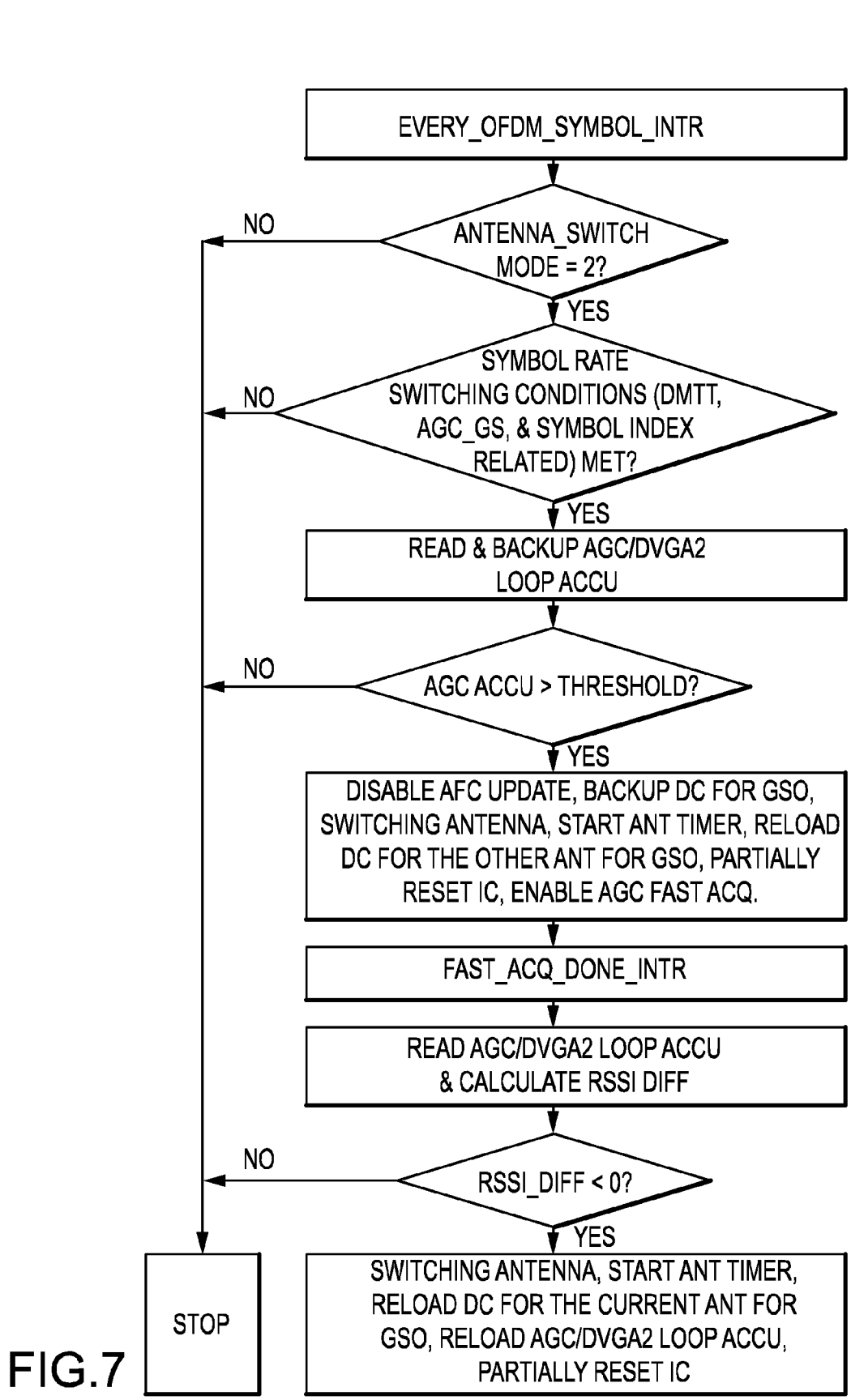
FIG. 7 illustrates an example flow diagram for symbol rate antenna switching.
Figure 8:
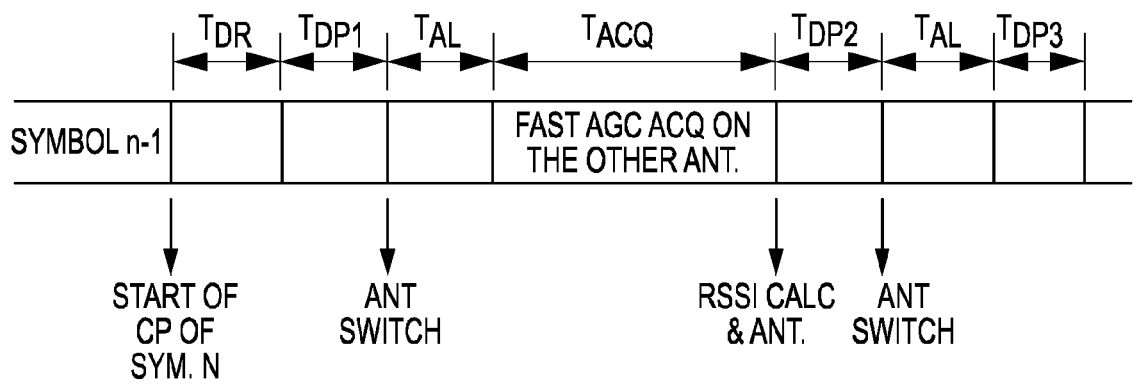
FIG. 8 illustrates an example timeline of symbol rate antenna switching.

After timer expires, Reload DC offset registers for GS 0 for the current antenna Reload AGC/DVGA2 registers Reset IC FIG. 7 illustrates an example flow diagram for symbol-rate antenna switching.

In another aspect, TDR (between 2 μs and 20 μs, depending on the DSP clock rate) is the DSP response time to a hardware symbol start interrupt. $T_{AL}$ is the antenna switching latency of approximately 1 μs. $T_{DP}$ (approximately 5 μs, for example) is the time for required DSP processing, such as checking the antenna switching criteria, backup and restoration of the DC offset, AGC, DVGA2, IC registers when switching antennas. $T_{ACQ}$ (256 samples, or approximately 46 μs) is the AGC/DVGA2 fast acquisition time. $T_{AS}$ (approximately 10 μs, for example) corresponds to the DSP cycles needed for RSSI calculation and antenna selection. Table 1 summarizes the various assumed values of the antenna switching timeline latencies.

TABLE 1

| DSP response time (TDK) | DSP processing time (TOP) | Antenna switch latency (AL) | AGC acquisition time (TACQ) | Antenna selection (TAS) |
|---|---|---|---|---|
| 2-20 μs | 5 μs | 1 μs | 46 μs | 10 μs |

In one example, $T_{DR}+2\,T_{AL}+2\,T_{DP}+T_{ACQ}+T_{AS}<88$ μs, which fits into the 92 μs margin of CP duration. In one aspect, the total time margin required for the antenna switching and selection fits into the duration of the cyclic prefix of the OFDM system.

Note that the available time for antenna switching within a CP increases for 5 MHz FLO bandwidth. For 8 MHz bandwidth and shorter CPs (for example 256 samples), it can be necessary to decrease AGC acquisition time by programming AGC fast acquisition period with a lower value, and/or increase DSP clock rate. Note also that for some extreme combination of bandwidth and CP length, it may not be possible to perform symbol rate switching. In this case, block rate switching or no switching can be selected.

In one aspect, the DSP storage requirement is as follows:
DSP storage that is persistent across OFDM symbols as shown in Table 2:

TABLE 2

| Variable(s) | Comments |
|---|---|
| Current Antenna Index | Antenna which is currently in use. The DSP should be able to read the antenna index from the SSBI block and update, if necessary. This variable should also be writable by the processor. |
| Last Switch index | OFDM symbol index when last antenna switch occurred |
| DC offset register values | 4 values for each antenna for GS 0 |

For these registers, DSP should retain their values until they are updated.
DSP storage that can be used during each RSSI measurement and antenna switching is shown in Table 3:

TABLE 3

| Variable(s) | Comments |
|---|---|
| AGC/DVGA register values | Only for current antenna |

For these registers, they are used for RSSI calculations and do not need to be retained across OFDM symbols.

In other aspects, the implementation could be modified as follows:
For DC offset block, the backup and restoration of DC registers may not be necessary if the DC component is not dependent on the antenna selection. Storage requirement and DSP cycles will be reduced if this is the case and the DSP need not be aware of the current Antenna Index, which simplifies the control logic as well.
Freeze IC coefficients rather than update it during RSSI measurement of the other antenna.
DC offset accumulators for the secondary antenna can be initialized with those values from the primary antenna upon power-up. In this way, only one DC calibration is need when the device is powered up.

Block Rate Switching
In one aspect, for the baseline design, antenna selection once per MLC block at the beginning of each MLC block is used. During wake-up preamble symbols, one extra OFDM symbol (or two symbols for 2K mode) is dedicated to measure the received signal strength indication (RSSI) on the antenna currently not selected. If the gap to the next MLC is not sufficient for sleeping mode, one extra symbol (or two for 2K mode) just before the next MLC can be dedicated for the RSSI measurement. After monitoring the RSSI on the unused antenna, the RSSI difference between the two antennas can be calculated as follows:

$$\text{RSSI\_Diff}=\text{CalPoint}(K_1)-\text{CalPoint}(K_2)-(d_1-d_2)$$
$$*3.01/1024\,(\text{dB}) \qquad \text{Eq. (2)}$$

where $K_1$ is the analog gain state while on the first antenna and $K_2$ is the analog gain state while on the second antenna, CalPoint($K_1$) and CalPoint($K_2$) are the corresponding calibration points of the two antennas for their respective gain states, and $d_1$ and $d_2$ are the AGC and DVGA accumulators when antenna 1 and 2 are selected, respectively. After calculating the RSSI difference, the antenna with greater RSSI can be selected for the following MLC block for reception.

The OFDM symbol devoted to RSSI measurement is indicated by the interrupt for the programmed OFDM symbol, which is programmed by the processor at the end of an MLC block. Note that the block rate antenna switching can be performed when time filtering is enabled. If CP or FLO bandwidth combination is such that symbol rate antenna switching is not feasible, block rate switching can also be selected even when the time-filter is disabled.

Figure 9:
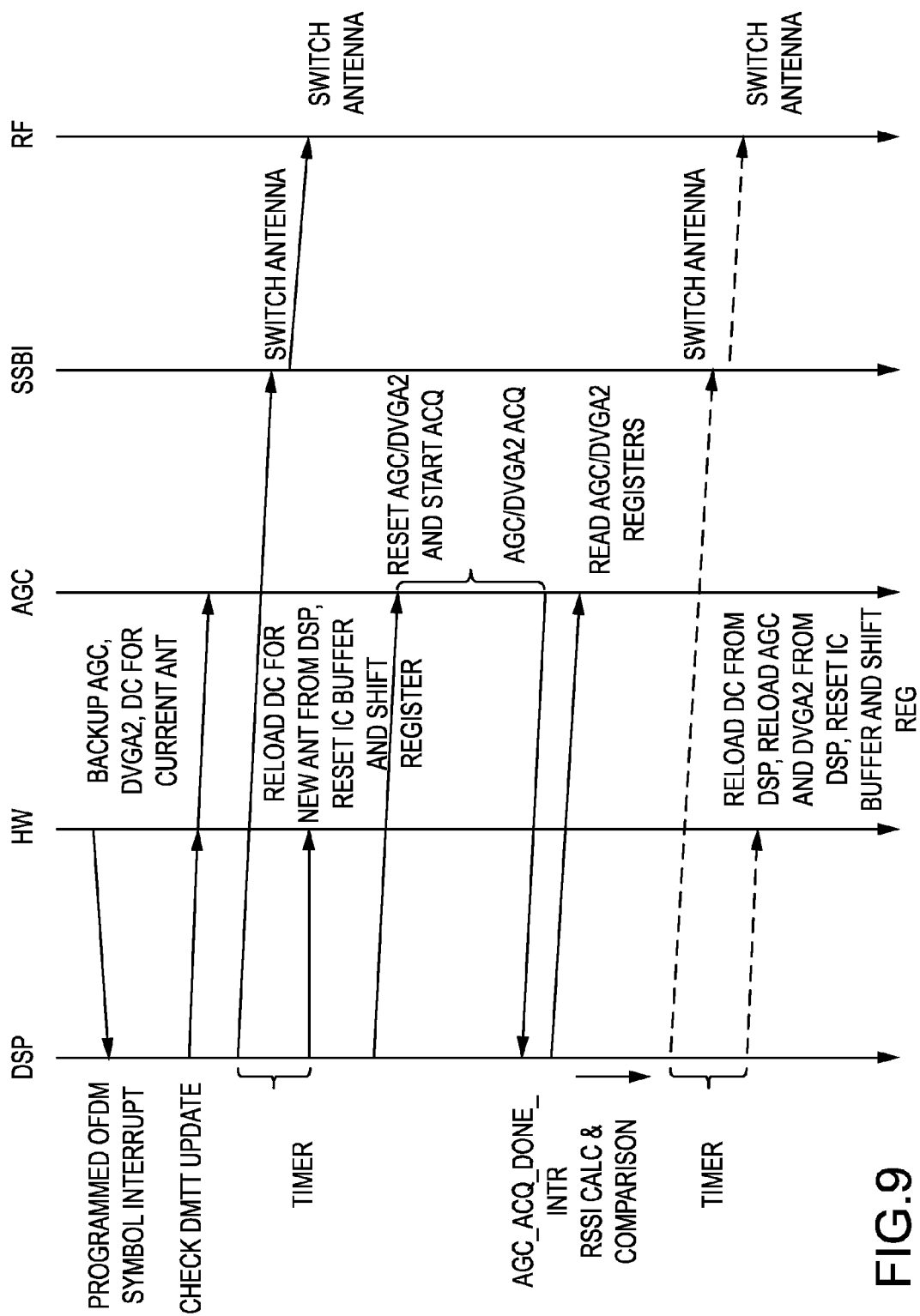
FIG. 9 illustrates an example interaction diagram for block rate antenna switching.

FIG. 9 illustrates an example interaction diagram for block rate antenna switching. FIG. 9 shows the interactions among the various subsystems, including DSP, HW, AGC, SSBI, and RF, for example.

In FIG. 9, unlike symbol rate antenna switching, the DSP does not need to check for AGC gain state changes and does not disable an automatic frequency control (AFC) update upon interrupt of the programmed OFDM symbol. However, if there is a pending data mode time tracking (DMTT) update at the beginning of the current OFDM symbol, the time margin needed for AGC/DVGA acquisition and RSSI measurement may be affected. In one example, the DSP still checks for the DMTT update flag before triggering the antenna switching, as done for symbol rate switching. The AGC/DVGA acquisition for block rate switching is the regular acquisition mode, which has 16 update periods with each period of 256 samples. As a result, the DSP timer expires in 4096 OFDM samples. The RSSI calculation at the end of the AGC/DVGA acquisition can involve different analog gain states. For the DC offset register backup and restore, the 24 DC accumulators can be backed up and restored, as analog gain state can change during the AGC/DVGA acquisition.

The following section provides an estimate of the DSP cycles required in the block rate antenna switching timeline. Upon interrupt of the programmed OFDM symbol, the following operations can be performed:
DSP checks if there is a positive DMTT offset
If check is false
    Read and back-up AGC/DVGA registers
    Back-up DC offset registers
    Switch antenna and start antenna timer
Upon expiration of the antenna switching timer:
Load DC offset registers
Reset IC
Reset AGC
Upon the AGC_ACQ_DONE interrupt:
Read AGC/DVGA registers
Compute RSSI difference RSSI_Diff=CalPoint(K_curr)−CalPoint(K_other)−
(d_curr−d_other)*3.01/1024 (dB), where d_curr and
d_other are the sum of AGC and DVGA loop accumulators for the two antennas. In one example, the
calibration points are programmed by the processor at
power-up.
If (RSSI_Diff>0)
  Switch antenna and start antenna timer
  After timer expires, Reload DC offset registers
  Reload AGC/DVGA2 registers
  Reset IC Similar to the symbol rate switching, DC offset register backup and restore may not be necessary if DC offset components do not depend on the antenna selection.

Interrupt Management

In another aspect, the switching modes can be controlled through two interrupts: the programmed_OFDM_symbol interrupt and the every_OFDM_symbol interrupt. In one aspect, the processor controls when the programmed_OFDM_symbol interrupt is fired. For block rate switching, the programmed_OFDM_symbol interrupt is used by the DSP to initiate RSSI measurement on the other antenna and antenna switching, as described in above. For symbol rate switching, the programmed_OFDM_symbol interrupt is used by the DSP to unmask every_OFDM_symbol interrupt, and subsequent antenna switches are initiated by the every_OFDM_symbol interrupt. In addition, the DSP masks the every_OFDM_symbol interrupt upon receiving End-of-block (EOB) interrupt. This unmasking and masking ensures that symbol rate switching is confined to OFDM symbols where the MLC is present, or to OFDM symbols which are close to the beginning and end of MLCs.

Thus, the two interrupts can be managed as follows:
  The processor programs the OFDM symbol index at which the programmed_OFDM symbol interrupt is fired. This symbol index is referred to as the switch symbol index. Typically, the switch symbol is a few OFDM symbols before the start of an MLC block.
  The processor can also command the DSP to unmask the every_OFDM_symbol interrupt if the gap from the next MLC block is too small for having a switch symbol index.
  For the symbol rate switching modes (Antenna_switch_mode2):
    The DSP unmasks the every_OFDM_symbol interrupt on receiving either the programmed_OFDM_symbol interrupt or an processor command to unmask the interrupt.
    If Doppler estimation is enabled:
      The DSP then reads the current OFDM symbol index, calculates the frame index, and checks if the processing for the first CHAN_OBS_READY is done for this frame. If this is false, the DSP switches to the primary antenna in order to enhance the reception for the Doppler estimation.
    The DSP masks the every_OFDM_symbol interrupt on receiving the EOB interrupt.

The bulk of the interrupt management is in determining the switch symbol index. In another aspect, note that the switch symbol determination is very similar to the Sleep determination and should be combined with it as much as possible. In addition, the additional switch symbol needs to be accounted in the sleep calculation by the processor.

In another aspect, the processor can determine the switch symbol index after the following events:
1. Receiving MLC locations for current super-frame from the Overhead Information Symbols (OIS). In one example, this step is the starting point at power-up or when a flow is activated after an idle period, in addition to loss of embedded OIS or activation of a new flow during MLC decoding. If Local OIS (LOIS) is processed, the determination is done after the LOIS, otherwise it is done after the Wide-Area OIS (WOIS).
2. On receiving End of Block (EOB) interrupt. When an MLC is being decoded in a super-frame, the processor calculates the gap to the next MLC block in the current super-frame and determines the switch symbol. This is done for all EOB interrupts except the last EOB in a super-frame. If at least one MLC has (16,14) R-S coding or no R-S coding, the last EOB occurs in Frame 4. If all the MLCs have (16,12) R-S coding, the last EOB could occur in Frame 3 and the determination of the switch symbol is deferred till the early exit decision is made.
3. At the end of Frame 3 or Frame 4. The end of Frame 3 or Frame 4 refers to the time after all the physical layer packets (PLPs) have been drained, a decision on early exit has been made (in Frame 3), all the MLC locations in the next super-frame have been obtained and a decision on re-acquisition has been made (in Frame 4).
4. Flow activation after end of Frame 3 or Frame 4. A flow could be activated after the end of Frame 3 or Frame 4 and this would require OIS from the next super-frame and update MLC locations.

Each of these scenarios and the resulting switch symbol index are described below in greater detail. The determination logic is similar after OIS or EOB, hence this description is combined.

Figure 10:
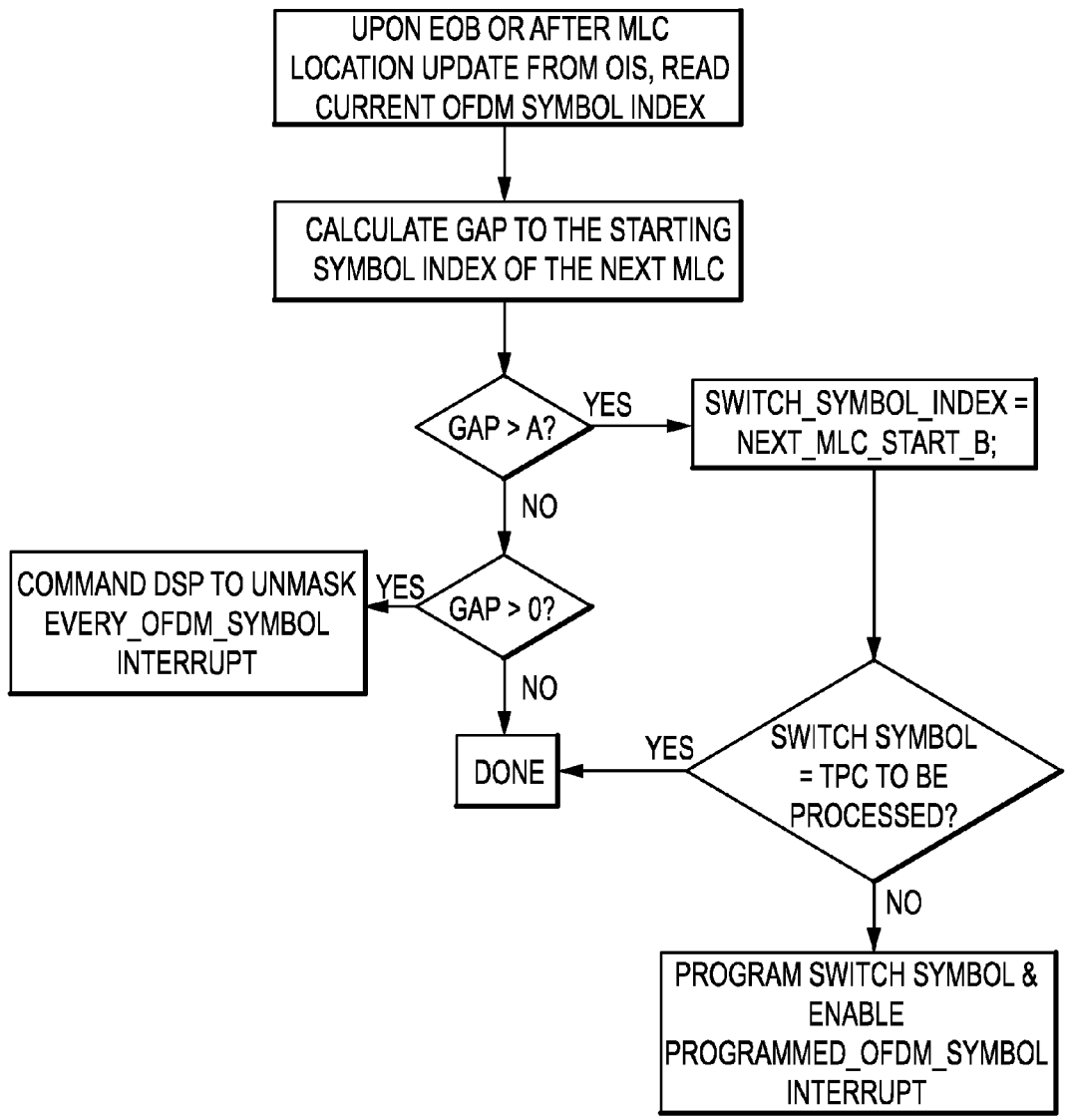
FIG. 10 illustrates an example flow diagram for switch symbol determination after OIS or EOB.

In another aspect, upon WOIS and/or LOIS, the PLPs are drained, the MLC locations are obtained and programmed into the hardware, as done currently in the processor. FIG. 10 illustrates an example flow diagram for switch symbol determination after OIS or EOB. The rest of the processing for determining the switch symbol is as shown in FIG. 10. The same logic can be applicable for all EOBs, except the last EOB in a super-frame (after Frame 3 or Frame 4). The software first reads the current OFDM symbol index in a register.

The current OFDM symbol index is compared to the start of the next MLC block and the gap is determined.

$$Gap=Next\_MLC\_start-current\_OFDM\_symbol\ index$$

Note that such a comparison is already done to determine if sleep is possible. However, it is important to note that the Next_MLC_start is the starting symbol for the MLC that occurs after the received EOB/WOIS/LOIS. Thus, it is possible the Gap calculation is done after next MLC has already started and in this case, the Gap would be negative. If the Gap is measured to the next MLC based on the current symbol number, the Gap calculation could miss an MLC in between and lead to an erroneous switch symbol.

If the gap is larger than a gap threshold (A), a switch symbol can be programmed and is determined to be a switch symbol offset of (B) OFDM symbols before the start of the next MLC, If (Gap>$A$) Switch Symbol Index=
  Next_MLC_start−$B$;

as shown in FIG. 10. If the switch symbol index corresponds to a Transition Pilot Channel (TPC) symbol that is to be processed for TPC-based timing, block rate switching cannot be performed on that symbol. Hence, the switch symbol is not programmed.

In one example, the value of the gap threshold (A) and the switch symbol offset depend on the time-filter length. This is because of the OFDM symbols before an MLC that are used for channel estimation and wake-up time tracking. Since wake-up time tracking is not performed with TPC based timing, A and B also depend on the time-tracking algorithm used.

Figure 11:
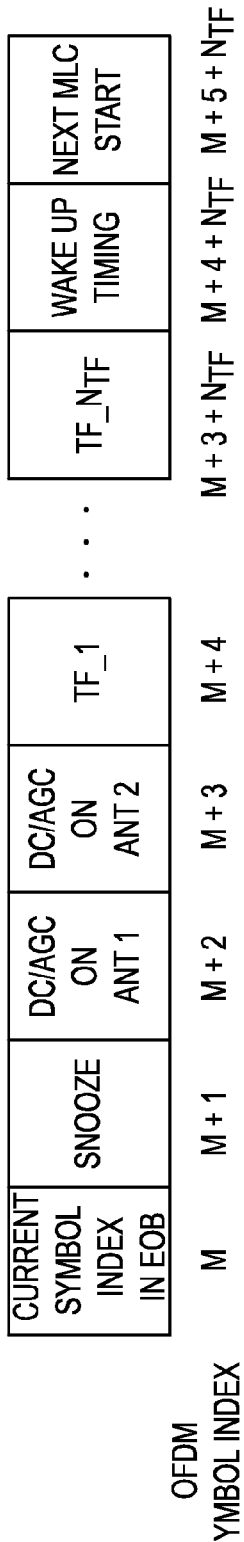
FIG. 11 illustrates an example timeline with wake-up time-tracking.

FIG. 11 illustrates an example timeline with wake-up time-tracking. In one aspect, the timeline from EOB interrupt to the start of the next MLC is as shown in FIG. 11 with wake-up time-tracking, with $N_{TF}$ being the length of the time-filter.

To allow for wake-up time-tracking, $N_{TF}+1$ OFDM symbols are needed before Next_MLC_start. In addition, two OFDM symbols are needed for DC/AGC acquisition on both antennas and one OFDM symbol is needed for snooze. Hence the gap threshold is $N_{TF}+4$. It is possible to optimize this further by allowing for smaller gaps, in which case the wake-up time-tracking is automatically skipped.

Figure 12:
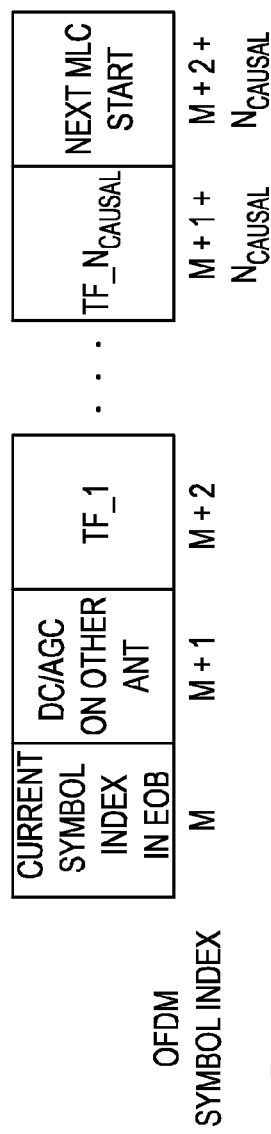
FIG. 12 illustrates an example timeline with TPC based timing.

FIG. 12 illustrates an example timeline with TPC based timing. The timeline from EOB interrupt to the start of the next MLC is as shown in FIG. 12 without wake-up time-tracking (or TPC based timing).

In another aspect, in FIG. 12, $$N_{Causal} = \frac{N_{TF} - 1}{2}$$

is the number of causal taps in the time-filter. With adaptive time-filtering or mode selection, the value of $N_{TF}$ can be controlled by the DSP as part of its time-filter selection algorithm. The DSP can assert an interrupt to the processor (TF_MODE_SELECTION_DONE) each time it completes a time-filter or mode selection. The number of time-filter taps ($N_{TF}$) can be stored in a register that can be read by the processor.

The timelines shown are for FFT sizes of 4K and 8K, where only one OFDM symbol is required for DC update and AGC acquisition on each antenna. For the 2K FFT size, two OFDM symbols are required for DC/AGC acquisition on each antenna, hence two extra OFDM symbols needs to be provided to allow for RSSI measurement on both antennas. In Table 4, the values of A and B are summarized as a function of the FFT size, the time-filter length and the time-tracking algorithm.

TABLE 4

| FFT size | Gap Threshold (A) | Switch symbol offset (B) | Comments |
|---|---|---|---|
| 4K/8K | $N_{TF} + 4$ | $N_{TF} + 2$ | DMTT wake-up timing |
| 4K/8K | $N_{Causal} + 1$ | $N_{Causal} + 1$ | TPC based timing |
| 2K | $N_{TF} + 6$ | $N_{TF} + 4$ | DMTT wake-up timing |
| 2K | $N_{Causal} + 2$ | $N_{Causal} + 2$ | TPC based timing |

Now, referring back to FIG. 10, if the Gap is less than the threshold A, then there is no time to perform a block rate antenna selection and the switch symbol is not programmed. However, it is still possible to perform symbol rate switching during the next MLC. Hence, the processor commands the DSP to unmask every_OFDM_symbol interrupt. The DSP executes this command only if it is in the symbol rate switching mode.

In another aspect, another corner case for determining the switch symbol is service collision due to the constraint of decoding only up to 4 PLPs per MAC time unit. This would happen in Frame 1 when one of the colliding MLCs is dropped.

Figure 13:
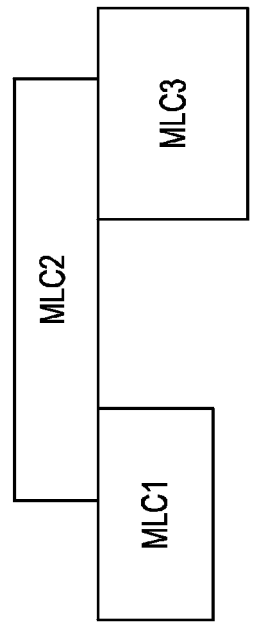
FIG. 13 illustrates an example service collision scenario.

When an MLC is dropped due to service collision, new switch symbols may be created or existing switch symbols may no longer be valid. FIG. 13 illustrates an example service collision scenario. This is illustrated in the example in FIG. 13, with three MLCs in a frame. If MLC1 is dropped in Frame 1, the switch symbol before MLC1 is not valid in subsequent frames (hardware could be in sleep mode during this portion). If MLC2 is dropped, a new switch symbol could be possible before MLC3.

In one example, in terms of determining the switch symbol, the processor can remove the dropped MLC from its list of MLC start symbols when it receives the service collision interrupt. Thus, if MLC1 is dropped, the Next_MLC_start after MLC3 would be the start of MLC2. Similarly, if MLC2 is dropped, the Next_MLC_start after MLC1 would be the start of MLC3 and a new switch symbol can be programmed upon receiving a new EOB interrupt after MLC1.

In another aspect, if at least one MLC has (16,14) R-S coding or no R-S coding and, hence, requires decoding in Frame 4, the last EOB in Frame 3 can be treated exactly the same as other EOBs in the super-frame, and the corresponding procedure for determining the next switch symbol is as described in above.

In some implementations, if all the MLCs have (16,12) R-S coding, then the processing in FIG. 10 is not done on the last EOB in Frame 3. Instead, the switch symbol determination can be deferred till the early exit decision is made.

If early exit does not occur, then the switch symbol can be determined as described above.

If early exit does occur, the switch symbol across the super-frame boundary can be determined based on MLC locations in the next super-frame as well as any processing requests at the super-frame boundary. This procedure is the same as that for the last EOB in Frame 4 and is as described below.

In another aspect, on the last EOB in Frame 4 (or Frame 3 with early exit), the PLPs are drained and the MLC locations for the next super-frame can be determined. However, the following conditions would necessitate a wake-up around the super-frame boundary instead of the start of the first MLC in the next super-frame.

Pilot Positioning Channel (PPC) processing request
Signaling Parameters Channel (SPC) processing request: Due to re-acquisition
Time Division Multiplex 1 (TDM1) search: Due to re-acquisition or RF handoff
WIC: Due to Adaptive thresholding or re-acquisition or RF handoff
LIC: Due to re-acquisition or RF hand-off
Time Division Multiplex 2 (TDM2): Due to Time-tracking
WOIS and/or LOIS decoding: Due to embedded OIS loss or re-acquisition or RF handoff The software switches to the primary antenna if processing is required at the super-frame boundary and updates the current antenna index in the DSP.

Figure 14:
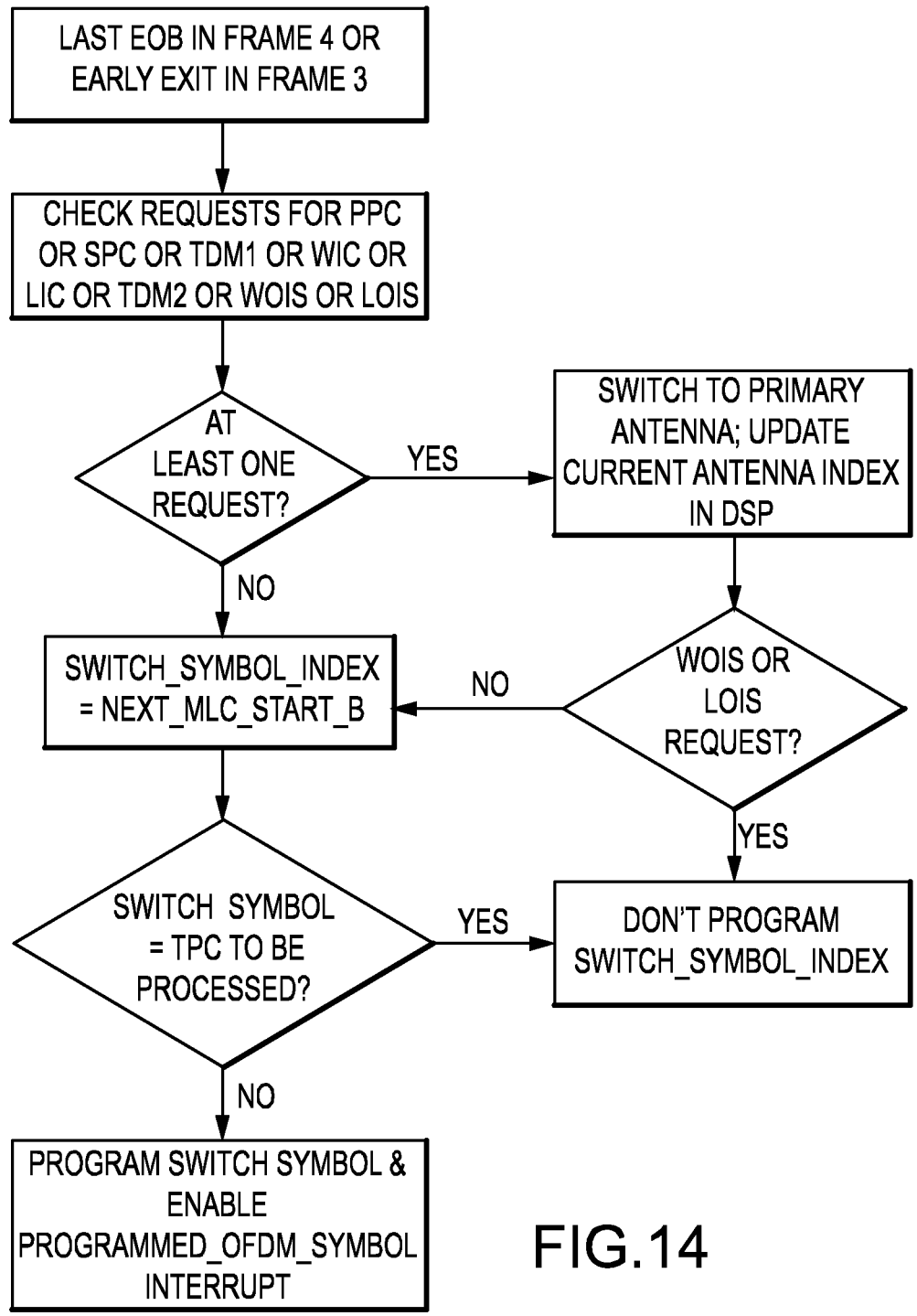
FIG. 14 illustrates an example diagram with programming switch symbol index after Frame 4 (or Frame 3 with early exit).

The overall flow diagram from processing at the end of Frame 4 (or Frame 3 with early exit) is as shown in FIG. 14. FIG. 14 illustrates an example diagram with programming switch symbol index after Frame 4 (or Frame 3 with early exit).

In another aspect, the last instant in a super-frame where the switch symbol can be programmed could be after the last EOB in Frame 4 (or Frame 3 with early exit), if there is activation of a new flow after all the MLCs have been processed in the current super-frame. In the current implementation, such a flow activation results in a rude wake-up of the hardware and a re-programming of the sleep duration, so that OIS can be requested.

In terms of the switch symbol programming, the programmed_OFDM_symbol interrupt should be cleared after the rude wake-up. Since OIS would be required, the switch symbol should be re-programmed after WOIS or LOIS.

The last portion of processor functionality needed to support switching diversity is the coordination of antenna switching with RF monitoring for MFN. Since a goal of RF monitoring is to get an estimate of the average power on the RF, it is not necessary to use the stronger antenna based on instantaneous RSSI measurements. Hence, the RF monitoring measurements can be performed on the primary antenna. Since RF monitoring as well as handoffs are implemented in processor and also depend on MLC location information, the processor can control the antenna during RF monitoring as well. The control by the processor also can prevent any potential conflict of SSBI commands between antenna switching and RF switching.

Figure 15:
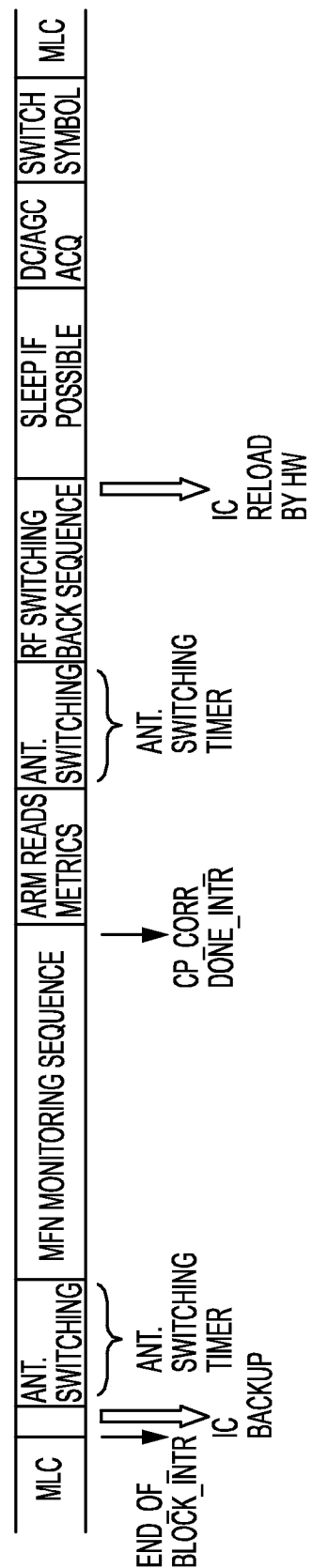
FIG. 15 illustrates an example RF monitoring timeline.

FIG. 15 illustrates an example RF monitoring timeline. The timeline for RF monitoring with antenna switching is as shown in FIG. 15. The sequence is triggered by the EOB interrupt. On this interrupt, the processor determines if RF monitoring is possible and triggers back-up of IC coefficients on the current antenna. Recall that DSP masks the every_OFDM_symbol interrupt on the EOB interrupt and does not perform any further antenna switches. After the IC back-up commands, the processor can switch to the primary antenna and execute the RF monitoring sequence (Method C or D). After the processor reads the RF metrics (RSSI and/or CP correlation), the antenna can be switched back before the RF switching is possible. The reason for switching the antenna before each RF switch is to ensure that DC and AGC acquisition is done on the correct antenna—primary antenna for the monitored RF and current antenna for the current RF.

Antenna selection is also possible with rates other than once per MLC block. For slower selection rates, lower diversity can be realized in a time-varying channel. For faster antenna selection rates, such as symbol rate switching, if time-filtering for channel estimation is enabled, the channel estimation can be disrupted if antenna is switched in the middle of MLC decoding. For the case in which time-filter is disabled (for example, very high Doppler), symbol rate antenna switching can be beneficial, especially there is significant difference between the antennas. Detailed design of symbol rate antenna selection may involve additional modifications.

One skilled in the art would understand that the examples described above are for illustration purposes only and are not meant to limit the scope or spirit of the present disclosure as other examples or variations of the examples given are possible and within the scope of the present disclosure.

Disclosed herein is the issue of enable/disable switching diversity under different scenarios. With gain differential between the primary and secondary antennas, there can be performance degradation if switching diversity is always turned on in the scenario of high Doppler spread. In one aspect, the secondary antenna can be selected at the beginning of an MLC block with non-zero probability depending on the actual value of the gain differential. However, statistically the secondary antenna is likely worse than the primary antenna for most of the symbols in the MLC block.

In one aspect, the DSP makes a selection between different switching diversity modes (single antenna, per-block antenna switching, symbol rate antenna switching) based on the Doppler estimation. The input to the enable/disable logic can be shared with the adaptive time-filtering logic, although the switching criteria could be different. Finally, the enabling/disabling of the switching diversity can have a slower rate than the per MLC block rate. For example, the switching diversity can be enabled/disabled once per N (programmable) superframes.

The loss incurred by the antenna switch can range from 0.2 to 0.5 dB, for example. If the antenna switch is implemented before the LNA, the insertion loss directly translates to the C/I loss in the received signal. However, if the antenna switch is implemented after LNA, the only effect it has is 0.2 to 0.5 dB LNA gain reduction, which can be easily compensated by the following DVGA. Since there is no C/I loss, the resulted performance is likely better than the pre-LNA option. The extra cost is an extra LNA and also pre-LNA filter.

In one example, gain differential of 3 dB between the primary and secondary antennas can be achieved. Due to phone form-factor limitation, there is usually correlation between the primary and secondary antennas. Lower correlation (correspondingly more antenna diversity) between the two antennas yields better performance.

In one aspect, the antenna diversity design employs symbol rate switching diversity. The FLO 6 MHz bandwidth mode with a CP length of 512 is used for illustration purposes. Other FLO bandwidths (5, 7, 8 MHz) can be readily supported by the design with little modifications. For example, for a CP length less than 512, symbol rate switching diversity is still possible through revising some system parameters and having DSP running at high clock rates.

Figure 16:
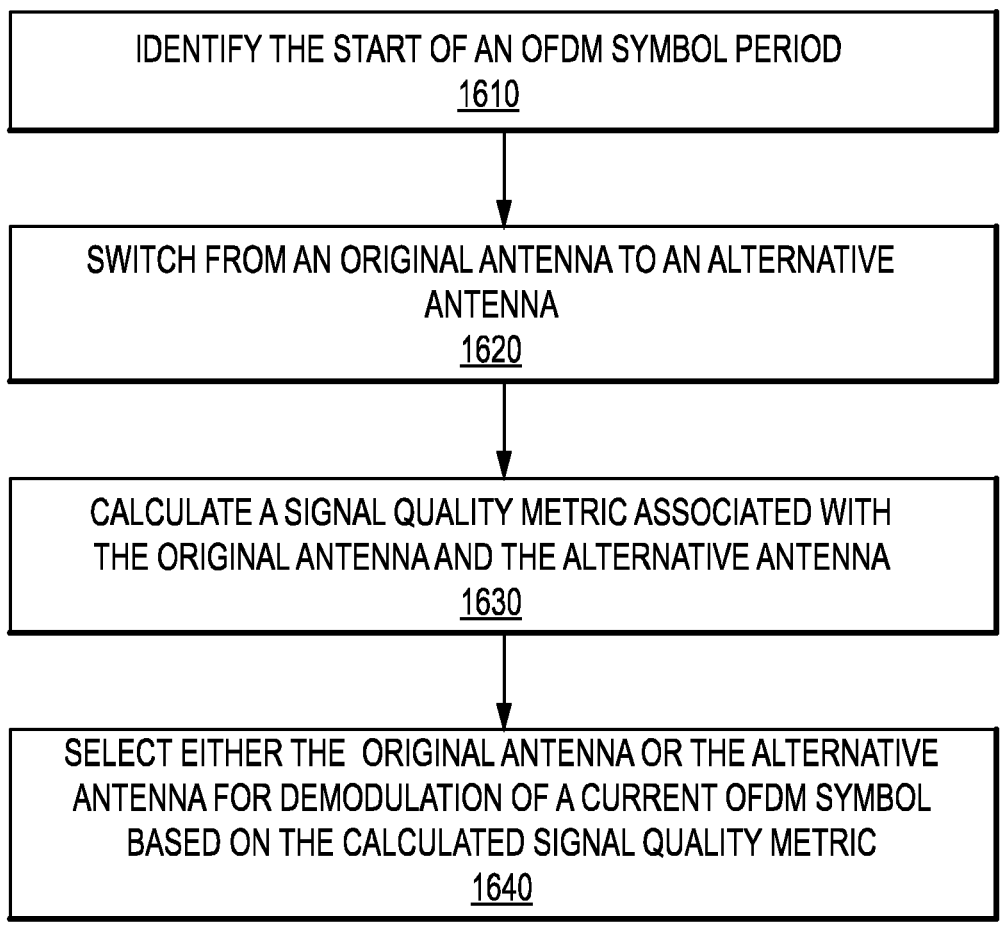
FIG. 16 illustrates an example flow diagram for antenna switching diversity.

FIG. 16 illustrates an example flow diagram for antenna switching diversity. In block 1610, identify the start of an OFDM symbol period. In block 1620, switch from an original antenna to an alternative antenna. In block 1630, calculate a signal quality metric associated with the original antenna and the alternative antenna. And, in block 1640, select either the original antenna or the alternative antenna for demodulation of a current OFDM symbol based on the calculated signal quality metric. One skilled in the art would understand that the steps in FIG. 16 are placed in their order for illustration purposes and that the steps may be interchanged, other steps may be added or steps illustrated may be deleted without affecting the spirit or scope of the present disclosure.

Additionally, one or more of the following steps may be included in the flow diagram of FIG. 16 without affecting the spirit or scope of the present disclosure. For example:

respond to an OFDM symbol counter interrupt. In one aspect, the OFDM symbol counter interrupt can indicate the beginning of a new OFDM symbol determine a receive antenna switching criteria. In one example, the receive antenna switching criteria can be used to decide whether to switch to an alternative antenna from an original antenna. The original antenna is the current antenna in use while the alternative antenna is a different antenna from the original antenna.

back up at least one receiver register with information associated with the original antenna if the receive antenna switching criteria is met. In one example, the receiver registers comprise DC offset, AGC, DVGA, IC, etc.

switch from the original antenna to the alternative antenna.

freeze a AGC gain state transition while the original antenna is switched to the alternative antenna. And, in one example, trigger a fast acquisition mode after freezing the AGC state transition. In one example, the fast acquisition mode is part of the AGC circuit and the DVGA circuit. In one example, the acquisition period is programmable to 16, 32, or 64 samples, instead of the nominal acquisition period of 256 samples.

perform a plurality of fast AGC acquisitions to acquire a signal. In one example, the number of AGC acquisitions is four. One skilled in the art would understand that the quantity of AGC acquisitions given herein is for illustrations purposes and that other quantity are acceptable and within the spirit and scope of the present disclosure.

In one example, the signal quality metric is based on RSSI measurements. And, in one example, calculate a RSSI difference. In one example, the RSSI difference is associated with the original antenna and the alternative antenna. In one example, the RSSI difference is based on the AGC and DVGA registers.

select the antenna with a greater signal quality metric (e.g., RSSI) for demodulations of a current OFDM symbol.

restore the at least one receiver register with information associated with the original antenna if the selected antenna is the original antenna.

checking a Data mode time tracking (DMTT) update flag.

performing at least one of the following: reloading DC offset for the alternative antenna, resetting an interference cancellation buffer and a shift register.

resetting at least one of the following: an Automatic Gain Control (AGC) or a digital variable gain amplifier (DVGA).

starting acquisition of a signal.

selecting between a symbol rate switching or a block rate switching. In one example, block rate switching can be selected and wherein the OFDM symbol interrupt is at the end of a Multicast Logical Channel (MLC) block. In one example, symbol rate switching can be selected and wherein the OFDM symbol interrupt is at the end of a previous OFDM symbol period.

In one example, a receiver DSP can perform one or more steps of the flow diagram in FIG. 16. One skilled in the art would understand that the steps disclosed in the example flow diagram in FIG. 16 can be interchanged in their order without departing from the scope and spirit of the present disclosure. Also, one skilled in the art would understand that the steps illustrated in the flow diagram are not exclusive and other steps may be included or one or more of the steps in the example flow diagram may be deleted without affecting the scope and spirit of the present disclosure.

Those of skill would further appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any non-transitory computer-readable medium known in the art or implemented in any computer program product known in the art.

In one or more examples, the steps or functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above can also be included within the scope of computer-readable media. Additionally, the operations of a method or algorithm may reside as one or any combination or set of codes and instructions on a machine readable medium and computer-readable medium, which may be incorporated into a computer program product.

Figure 17:
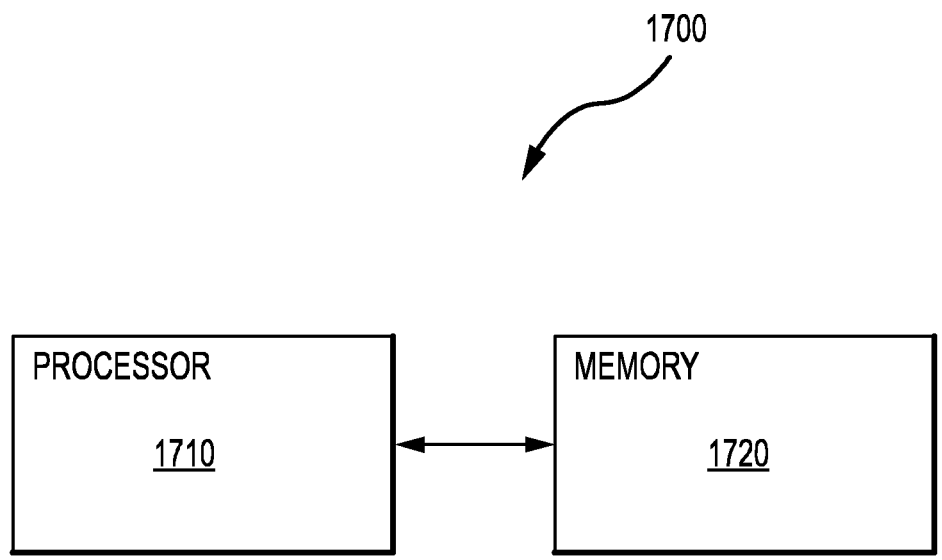
FIG. 17 illustrates an example of a device comprising a processor in communication with a memory for executing the processes for antenna switching diversity.

In one example, the illustrative components, flow diagrams, logical blocks, modules and/or algorithm steps described herein are implemented or performed with one or more processors. In one aspect, a processor is coupled with a memory which stores data, metadata, program instructions, etc., to be executed by the processor for implementing or performing the various flow diagrams, logical blocks and/or modules described herein. FIG. 17 illustrates an example of a device 1700 comprising a processor 1710 in communication with a memory 1720 for executing the processes for antenna switching diversity. In one example, the device 1700 is used to implement the algorithm illustrated in FIG. 16. In one aspect, the memory 1720 is located within the processor 1710. In another aspect, the memory 1720 is external to the processor 1710. In one aspect, the processor includes circuitry for implementing or performing the various flow diagrams, logical blocks and/or modules described herein.

Figure 18:
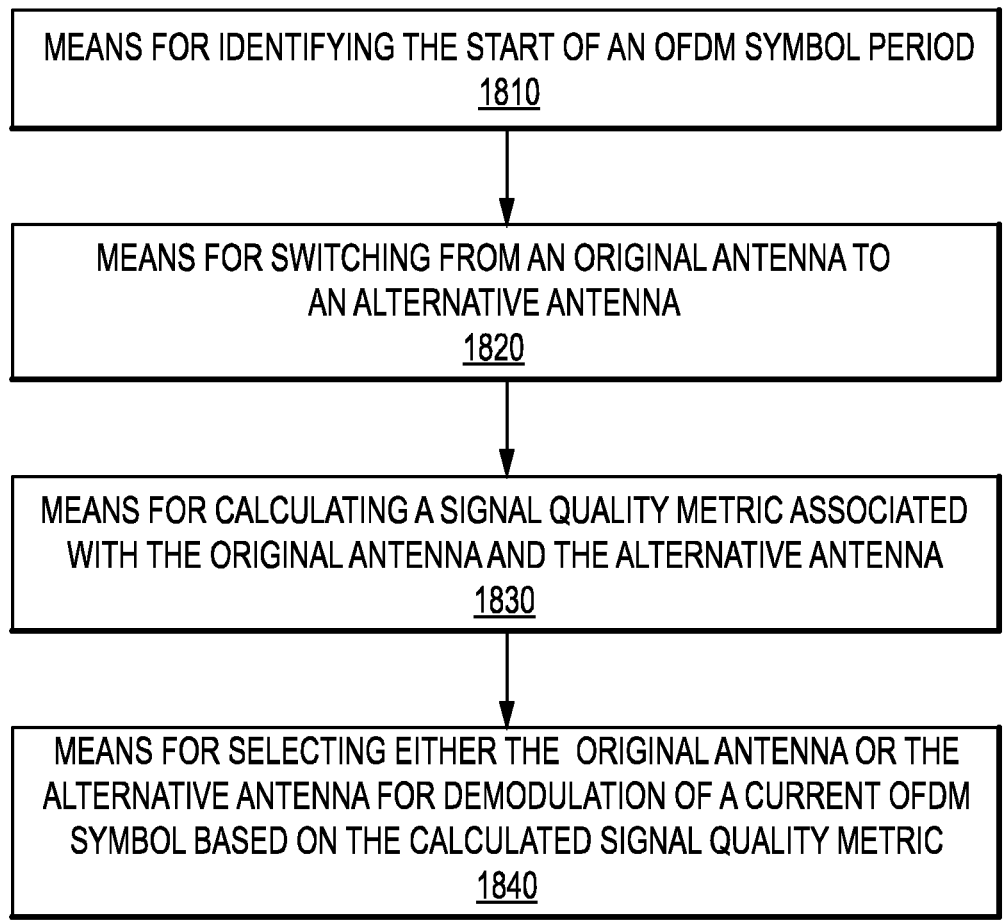
FIG. 18 illustrates an example of a device suitable for antenna switching diversity.

FIG. 18 illustrates an example of a device 1800 suitable for antenna switching diversity. In one aspect, the device 1800 is implemented by at least one processor comprising one or more modules configured to provide different aspects of symbol rate receive antenna switching diversity as described herein in blocks 1810, 1820, 1830 and 1840. For example, each module comprises hardware, firmware, software, or any combination thereof. In one aspect, the device 1800 is also implemented by at least one memory in communication with the at least one processor.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for antenna switching diversity comprising:
identifying the start of an OFDM symbol period for an OFDM symbol, wherein the start of the OFDM symbol period is identified with an OFDM symbol counter interrupt;
switching, in response to the OFDM symbol counter interrupt, from an original antenna to at least one alternative antenna during a cyclic prefix period of the OFDM symbol;
calculating a signal quality metric associated with the original antenna and the alternative antenna; and
selecting, during the cyclic prefix period of the OFDM symbol, either the original antenna or the alternative antenna for demodulation of the OFDM symbol based on the calculated signal quality metric.

2. The method of claim 1, wherein the signal quality metric is based on RSSI measurements.

3. The method of claim 2, wherein the RSSI measurements are taken within a cyclic prefix period.

4. The method of claim 1, further comprising determining an antenna switching criteria to decide whether to switch to the alternative antenna from the original antenna.

5. The method of claim 4, further comprising backing up at least one receiver register with information associated with the original antenna if the antenna switching criteria is met.

6. The method of claim 5, further comprising freezing an AGC gain state transition while the original antenna is switched to the alternative antenna.

7. The method of claim 6, further comprising triggering a fast acquisition mode after freezing the AGC state transition.

8. The method of claim 7, wherein the fast acquisition mode is part of an AGC circuit and a DVGA circuit.

9. The method of claim 6, further comprising performing a plurality of fast AGC acquisitions to acquire a signal.

10. The method of claim 6, further comprising selecting either the original antenna or the alternative antenna depending on which has the greater RSSI.

11. The method of claim 10, further comprising restoring the at least one receiver register with information associated with the original antenna if the original antenna is selected.

12. The method of claim 1, further comprising checking a Data mode time tracking (DMTT) update flag.

13. The method of claim 12, further comprising performing at least one of the following: reloading DC offset for the alternative antenna, resetting an interference cancellation buffer and a shift register.

14. The method of claim 13, further comprising resetting at least one of the following: an Automatic Gain Control (AGC) or a digital variable gain amplifier (DVGA).

15. The method of claim 14, further comprising starting acquisition of a signal.

16. The method of claim 1, further comprising selecting between a symbol rate switching or a block rate switching.

17. The method of claim 16, wherein the block rate switching is selected and wherein the OFDM symbol interrupt is at the start of a Multicast Logical Channel (MLC) block.

18. The method of claim 16, wherein the symbol rate switching is selected and wherein the OFDM symbol interrupt is at the end of a previous OFDM symbol period.

19. A receiver for antenna switching diversity comprising a processor and a memory, the memory containing program code executable by the processor for performing the following:
identifying the start of an OFDM symbol period for an OFDM symbol, wherein the start of the OFDM symbol period is identified with an OFDM symbol counter interrupt;
switching, in response to the OFDM symbol counter interrupt, from an original antenna to at least one alternative antenna during a cyclic prefix period of the OFDM symbol;
calculating a signal quality metric associated with the original antenna and the alternative antenna; and
selecting, during the cyclic prefix period of the OFDM symbol, either the original antenna or the alternative antenna for demodulation of the OFDM symbol based on the calculated signal quality metric.

20. The receiver of claim 19, wherein the signal quality metric is based on RSSI measurements.

21. The receiver of claim 20, wherein the RSSI measurements are taken within a cyclic prefix period.

22. The receiver of claim 19, wherein the memory further comprising program code for determining an antenna switching criteria to decide whether to switch to the alternative antenna from the original antenna.

23. The receiver of claim 22, wherein the memory further comprising program code for backing up at least one receiver register with information associated with the original antenna if the antenna switching criteria is met.

24. The receiver of claim 23, wherein the memory further comprising program code for freezing an AGC gain state transition while the original antenna is switched to the alternative antenna.

25. The receiver of claim 24, wherein the memory further comprising program code for triggering a fast acquisition mode after freezing the AGC state transition.

26. The receiver of claim 25, wherein the fast acquisition mode is part of an AGC circuit and a DVGA circuit.

27. The receiver of claim 24, wherein the memory further comprising program code for performing a plurality of fast AGC acquisitions to acquire a signal.

28. The receiver of claim 24, wherein the memory further comprising program code for selecting either the original antenna or the alternative antenna depending on which has the greater RSSI.

29. The receiver of claim 28, wherein the memory further comprising program code for restoring the at least one receiver register with information associated with the original antenna if the original antenna is selected.

30. The receiver of claim 19, wherein the memory further comprising program code for checking a Data mode time tracking (DMTT) update flag.

31. The receiver of claim 30, wherein the memory further comprising program code for performing at least one of the following: reloading DC offset for the alternative antenna, resetting an interference cancellation buffer and a shift register.

32. The receiver of claim 31, wherein the memory further comprising program code for resetting at least one of the following: an Automatic Gain Control (AGC) or a digital variable gain amplifier (DVGA).

33. The receiver of claim 32, wherein the memory further comprising program code for starting acquisition of a signal.

34. The receiver of claim 19, wherein the memory further comprising program code for selecting between a symbol rate switching or a block rate switching.

35. The receiver of claim 34, wherein the block rate switching is selected and wherein the OFDM symbol interrupt is at the start of a Multicast Logical Channel (MLC) block.

36. The receiver of claim 34, wherein the symbol rate switching is selected and wherein the OFDM symbol interrupt is at the end of a previous OFDM symbol period.

37. An apparatus for antenna switching diversity comprising:
- means for identifying the start of an OFDM symbol period for an OFDM symbol, wherein the start of the OFDM symbol period is identified with an OFDM symbol counter interrupt;
- means for switching, in response to the OFDM symbol counter interrupt, from an original antenna to at least one alternative antenna during a cyclic prefix period of the OFDM symbol;
- means for calculating a signal quality metric associated with the original antenna and the alternative antenna; and
- means for selecting, during the cyclic prefix period of the OFDM symbol, either the original antenna or the alternative antenna for demodulation of the OFDM symbol based on the calculated signal quality metric.

38. The apparatus of claim 37, wherein the signal quality metric is based on RSSI measurements taken within a cyclic prefix period.

39. The apparatus of claim 37, further comprising means for backing up at least one receiver register with information associated with the original antenna.

40. The apparatus of claim 39, further comprising means for freezing an AGC gain state transition while the original antenna is switched to the alternative antenna and means for triggering a fast acquisition mode after freezing the AGC state transition.

41. The apparatus of claim 37, further comprising means for checking a Data mode time tracking (DMTT) update flag and means for performing at least one of the following: reloading DC offset for the alternative antenna, resetting an interference cancellation buffer and a shift register.

42. The apparatus of claim 37, further comprising means for selecting between a symbol rate switching or a block rate switching.

43. The apparatus of claim 42, wherein the block rate switching is selected and wherein the OFDM symbol interrupt is at the start of a Multicast Logical Channel (MLC) block, and wherein the symbol rate switching is selected and wherein the OFDM symbol interrupt is at the end of a previous OFDM symbol period.

44. A non-transitory computer-readable medium storing a computer program, wherein execution of the computer program is for:
- identifying the start of an OFDM symbol period for an OFDM symbol, wherein the start of the OFDM symbol period is identified with an OFDM symbol counter interrupt;
- switching, response to the OFDM symbol counter interrupt, from an original antenna to at least one alternative antenna during a cyclic prefix period of the OFDM symbol;
- calculating a signal quality metric associated with the original antenna and the alternative antenna; and
- selecting, during the cyclic prefix period of the OFDM symbol, either the original antenna or the alternative antenna for demodulation of the OFDM symbol based on the calculated signal quality metric.

45. The computer-readable medium of claim 44, wherein the signal quality metric is based on RSSI measurements taken within a cyclic prefix period.

46. The computer-readable medium of claim 44, further comprising backing up at least one receiver register with information associated with the original antenna.

47. The computer-readable medium of claim 46, further comprising:
- freezing an AGC gain state transition while the original antenna is switched to the alternative antenna; and
- triggering a fast acquisition mode after freezing the AGC state transition.

48. The computer-readable medium of claim 44, further comprising:
- checking a Data mode time tracking (DMTT) update flag; and
- performing at least one of the following: reloading DC offset for the alternative antenna, resetting an interference cancellation buffer and a shift register.

49. The computer-readable medium of claim 44, further comprising selecting between a symbol rate switching or a block rate switching.

50. The computer-readable medium of claim 49, wherein the block rate switching is selected and wherein the OFDM symbol interrupt is at the start of a Multicast Logical Channel (MLC) block, and wherein the symbol rate switching is selected and wherein the OFDM symbol interrupt is at the end of a previous OFDM symbol period.

* * * * *